US012807310B2

(12) United States Patent
Sha et al.

(10) Patent No.: US 12,807,310 B2
(45) Date of Patent: Nov. 24, 2026

(54) VERTICAL TAKE-OFF AND LANDING AIRCRAFT AND CONTROL METHOD THEREOF

(71) Applicant: Sichuan Aerofugia Technology Co., Ltd., Chengdu (CN)

(72) Inventors: Yongxiang Sha, Chengdu (CN); Songbai Xue, Chengdu (CN); Shaiming Xie, Chengdu (CN); Zhaohua Xu, Chengdu (CN); Junchang Luo, Chengdu (CN); Wenjie Zhou, Chengdu (CN); Changyun Wang, Chengdu (CN); Tang Li, Chengdu (CN)

(73) Assignee: Sichuan Aerofugia Technology Co., Ltd., Chengdu (CN)

( * ) Notice: Subject to any disclaimer, the term of this patent is extended or adjusted under 35 U.S.C. 154(b) by 0 days.

(21) Appl. No.: 19/380,838

(22) Filed: Nov. 5, 2025

(65) Prior Publication Data

US 2026/0062121 A1 Mar. 5, 2026

Related U.S. Application Data

(63) Continuation of application No. PCT/CN2024/119872, filed on Sep. 19, 2024.

(30) Foreign Application Priority Data

Dec. 7, 2023 (CN) ......................... 202311677618.7
Dec. 7, 2023 (CN) ......................... 202323340559.2

(51) Int. Cl.
*B64C 29/00* (2006.01)
*B64C 5/02* (2006.01)
*G05D 1/652* (2024.01)

(52) U.S. Cl.
CPC ......... *B64C 29/0033* (2013.01); *G05D 1/652* (2024.01); *B64C 5/02* (2013.01)

(58) Field of Classification Search
CPC ........ B64C 17/02; B64C 29/003; B64U 40/20
See application file for complete search history.

(56) References Cited

U.S. PATENT DOCUMENTS 9,120,560 B1 9/2015 Armer et al.
2016/0236775 A1 8/2016 Eshkenazy et al.
(Continued)

FOREIGN PATENT DOCUMENTS

CN 106828915 A 6/2017
CN 116080900 A 5/2023
(Continued)

OTHER PUBLICATIONS

First Office Action issued in counterpart Chinese Patent Application No. 202311677618.7, dated Jun. 21, 2025.
(Continued)

*Primary Examiner* — Timothy D Collins
*Assistant Examiner* — Terri L Filosi
(74) *Attorney, Agent, or Firm* — Westbridge IP LLC

(57) ABSTRACT

A vertical take-off and landing aircraft includes: a fuselage and 2N tilting rotors. Both sides of the fuselage are provided with a wing symmetrically, a tail of the fuselage is provided with an empennage, and ruddervators are provided at the empennage. 2N tilting rotors are symmetrically provided at both sides of the fuselage, and a part of the 2N tilting rotors are provided on the empennage. N is a natural number greater than or equal to 2; in a vertical take-off and landing state, projections of propellers of the 2N tilting rotors on a horizontal plane are centrally symmetrical about point B,
(Continued)

point B and a center of gravity point G of the vertical take-off and landing aircraft are both provided in a symmetry plane of the fuselage.

20 Claims, 16 Drawing Sheets

(56) References Cited

U.S. PATENT DOCUMENTS

| | | | | |
|---|---|---|---|---|
| 2020/0148347 | A1* | 5/2020 | Bevirt | B64C 11/46 |
| 2022/0009626 | A1* | 1/2022 | Baharav | B64C 27/26 |
| 2023/0166838 | A1* | 6/2023 | Mikic | B64C 27/52 244/7 R |

FOREIGN PATENT DOCUMENTS

| | | | |
|---|---|---|---|
| CN | 116215852 | A | 6/2023 |
| CN | 219257673 | U | 6/2023 |
| CN | 117360772 | A | 1/2024 |
| CN | 117416506 | A | 1/2024 |
| CN | 221251744 | U | 7/2024 |
| CN | 221294109 | U | 7/2024 |
| RU | 2795885 | C1 | 5/2023 |
| WO | 2017016096 | A1 | 2/2017 |
| WO | 2023197567 | A1 | 10/2023 |

OTHER PUBLICATIONS

International Search Report issued in corresponding PCT Application No. PCT/CN2024/119872, dated Dec. 23, 2024.

Written Opinion issued in corresponding PCT Application No. PCT/CN2024/119872, dated Dec. 23, 2024.

European Search Report issued in counterpart European Patent Application No. EP 24899418.8, dated Aug. 11, 2026.

* cited by examiner

VERTICAL TAKE-OFF AND LANDING AIRCRAFT AND CONTROL METHOD THEREOF

CROSS-REFERENCE TO RELATED APPLICATIONS

This application is a continuation application of International Application No. PCT/CN2024/119872, filed on Sep. 19, 2024, which claims priority to Chinese Patent Application No. 202311677618.7, filed on Dec. 7, 2023, and Chinese Patent Application No. 202323340559.2, filed on Dec. 7, 2023. The disclosures of the above-mentioned applications are incorporated herein by reference in their entireties.

TECHNICAL FIELD

The present application relates to the technical field of aircraft, and specifically to a vertical take-off and landing aircraft and a control method thereof.

BACKGROUND

Vertical take-off and landing fixed-wing aircraft (distributed propulsion type) have both the vertical take-off and landing capability of helicopter and the high-efficiency and high-speed horizontal flight capability of fixed-wing aircraft. Compared with helicopters, they are quieter, more comfortable and economical. Compared with multi-rotors, they are more efficient and have a longer flying range. Compared with fixed-wing aircraft, they can take off and land vertically on take-off and landing platforms in cities, making them an excellent choice for urban air travel. However, in existing vertical take-off and landing aircraft, when the rotor is provided at the empennage, the airflow generated by the rotor and the airflow generated by the empennage interfere with each other, which easily causes difficulty in pitch control, which will bring unpredictable technical difficulties to the flight control of the vertical take-off and landing aircraft.

SUMMARY

In view of the above shortcomings of the prior art, the present application provides a vertical take-off and landing aircraft and a control method thereof to improve the problem that the airflow interference between the tilting rotor on the empennage and the empennage in the existing vertical take-off and landing aircraft is relatively large, and it is not easy to perform pitch control.

To achieve the above purpose and other related purpose, the present application provides a vertical take-off and landing aircraft including: a fuselage and 2N tilting rotors. Both sides of the fuselage are provided with wings symmetrically, a tail of the fuselage is provided with an empennage, and ruddervators are provided at the empennage. 2N tilting rotors are symmetrically provided at both sides of the fuselage, a part of the 2N tilting rotors are provided on the empennage. N is a natural number greater than or equal to 2; in a vertical take-off and landing state, projections of propellers of the 2N tilting rotors on a horizontal plane are centrally symmetrical about point B, the point B and a center of gravity point G of the vertical take-off and landing aircraft are both provided in a symmetry plane of the fuselage, and the point B is provided at a side of the point G close to the empennage; during the transition flight of the vertical take-off and landing aircraft, both the point G and the point B is configured to move along the symmetry plane, and the point B is always provided at the side of point G close to the empennage.

In an example of a vertical take-off and landing aircraft of the present application, during a flight, a rotation axis of any tilting rotor on the empennage and a rotation axis of any tilting rotor at other positions have projections that are not parallel on the symmetry plane of the fuselage.

In an example of a vertical take-off and landing aircraft of the present application, in a cruising state and/or a vertical take-off state and/or a transition state, a tilt speed of any tilting rotor on the empennage and a tilt speed of any tilting rotor at other positions have a first difference, and the first difference is not equal to 0.

In an example of a vertical take-off and landing aircraft of the present application, in a cruising state and/or a vertical take-off state and/or a transition state, a rotation speed of any tilting rotor on the empennage and a rotation speed of any tilting rotor at other positions have a second difference, and the second difference is not equal to 0.

In an example of a vertical take-off and landing aircraft of the present application, the vertical take-off and landing aircraft is configured to adopt following method for pitch control:

- during the flight, allocating a pitch control distribution between the ruddervators and the 2N tilting rotors according to a current airspeed or dynamic pressure; and
- controlling the ruddervators and the 2N tilting rotors respectively according to the pitch control distribution to achieve pitch trim and maneuver.

In an example of a vertical take-off and landing aircraft of the present application, the controlling the 2N tilting rotors respectively according to the pitch control distribution includes:

- differentially adjusting a pitch moment to perform the pitch trim and the maneuver by a tilt angle difference between the tilting rotor on the empennage and any one of the other tilting rotors; and/or
- differentially adjusting the pitch moment to perform the pitch trim and the maneuver by a rotation speed difference between the tilting rotor on the empennage and any one of the other tilting rotors; and/or
- differentially adjusting the pitch moment to perform the pitch trim and the maneuver by a tilt speed difference between the tilting rotor on the empennage and any one of the other tilting rotors.

In an example of a vertical take-off and landing aircraft of the present application, the vertical take-off and landing aircraft includes four tilting rotors symmetrically provided at both sides of the fuselage, two of the tilting rotors are symmetrically provided on the wing about the fuselage, and another two of the tilting rotors are symmetrically provided on the empennage.

In an example of a vertical take-off and landing aircraft of the present application, the vertical take-off and landing aircraft includes six tilting rotors symmetrically provided at both sides of the fuselage, four of the tilting rotors are symmetrically provided on the wing about the fuselage, and another two of the tilting rotors are symmetrically provided on the empennage.

In an example of a vertical take-off and landing aircraft of the present application, the empennage is a V-shaped tail, the two tilting rotors provided on the empennage are tilting-nacelle rotors, and the two tilting-nacelle rotors are respectively provided on two upper tips of the V-shaped tail.

In an example of a vertical take-off and landing aircraft of the present application, two tilting rotors are provided at wing tips of the wings, and the tilting rotors provided at the wing tips of the wings are tilting-nacelle rotors.

In an example of a vertical take-off and landing aircraft of the present application, the vertical take-off and landing aircraft further includes 2M fixed rotors, with M is a natural number greater than or equal to 2; the 2M fixed rotors are symmetrically provided at the wings on both sides of the fuselage and provided at the outer side of the tilting rotors; in the vertical take-off and landing state, projections of all the fixed rotors on the horizontal plane are centrally symmetrical about point A, and the point A is provided in the symmetry plane of the fuselage; during the transition flight of the vertical take-off and landing aircraft, the point G is provided at a side of the point A close to a nose or the point G coincides with the point A, and the point B is always provided at a side of the point A close to the empennage.

In an example of a vertical take-off and landing aircraft of the present application, an angle between rotation axes of the 2M fixed rotors and the symmetry plane of the fuselage is −15° to +15°; and/or an angle between a plane formed by the rotation axes of the 2N tilting rotors during a tilting process and the symmetry plane of the fuselage is −15° to +15°.

In an example of a vertical take-off and landing aircraft of the present application, the vertical take-off and landing aircraft includes four tilting rotors and four fixed rotors; a distance from the center of gravity point G to the point A is L1, $L1 \geq 0$, a distance from the point A to the point B is L2, $L2 > 0$, a spacing between the four fixed rotors along a fuselage extension direction is L3, and a spacing between the four tilting rotors along the fuselage extension direction is L4, then $0.1(L3+L4) \geq 4L1+2L2 \geq 0.01(L3+L4)$.

In an example of a vertical take-off and landing aircraft of the present application, the empennage is a V-shaped tail, the two tilting rotors provided on the empennage are tilting-nacelle rotors, and the two tilting-nacelle rotors are respectively provided on two upper tips of the V-shaped tail.

In an example of a vertical take-off and landing aircraft of the present application, the vertical take-off and landing aircraft is configured to adopt following method for pitch control:

- during the flight, allocating a pitch control distribution among the ruddervators and the 2N tilting rotors and the 2M fixed rotors according to a current airspeed or dynamic pressure; and
- controlling the ruddervators, the 2N tilting rotors and the 2M fixed rotors respectively according to the pitch control distribution to achieve pitch trim and maneuver.

In an example of a vertical take-off and landing aircraft of the present application, the four fixed rotors are symmetrically provided at both sides of the fuselage, the four tilting rotors are provided at the inner side of the four fixed rotors, two of the tilting rotors are symmetrically provided on the empennage, and the two tilting rotors provided on the empennage are tilting-nacelle rotors.

In an example of a vertical take-off and landing aircraft of the present application, the empennage is a V-shaped tail, two tilting rotors are provided on the V-shaped tail, and the two tilting rotors are respectively provided at two upper tips of the V-shaped tail; in the vertical take-off and landing state, along a direction parallel to a roll axis of the vertical take-off and landing aircraft, a distance between a rotation center of the tilting rotor on the empennage and a leading edge of the upper tip of the V-shaped tail is t1, and a chord length of the upper tip of the V-shaped tail is t2, and a ratio of t1 to t2 is 15% to 40%.

In an example of a vertical take-off and landing aircraft of the present application, the tilting rotor provided on the empennage is a tilting-nacelle rotor; the tilting rotor provided outside the empennage is a tilting-propeller rotor.

In an example of a vertical take-off and landing aircraft of the present application, wing tips of the wing is provided with the tilting rotors, and the tilting rotors provided on the empennage and the tilting rotors provided on the wing tips of the wing are both tilting-nacelle rotors.

In an example of a vertical take-off and landing aircraft of the present application, the tilting-nacelle rotor includes a first rotor and a power pod, the first rotor is connected to the power pod, the power pod is rotatably connected to the empennage or the wing, and the power pod tilts synchronously with the first rotor during tilting process of the first rotor.

In an example of a vertical take-off and landing aircraft of the present application, the first rotor includes a propeller and a rotary drive device, and the propeller is provided on an output shaft of the rotary drive device; the power pod includes a pod shell and a tilt mechanism provided in the pod shell, the tilt mechanism is configured to drive the rotary drive device to tilt, so as to drive the propeller to tilt.

In an example of a vertical take-off and landing aircraft of the present application, the tilt mechanism includes: a rocker arm, a drive arm, a tilt drive device and a connect rod; the rocker arm and the drive arm are both rotatably provided at the empennage; a base of the tilt drive device is provided at the empennage, and a drive end of the tilt drive device is configured to drive the drive arm to rotate; the connect rod is rotatably connected to the drive arm and the rocker arm respectively; the rocker arm is fixedly connected to the rotation drive device of the first rotor.

In an example of a vertical take-off and landing aircraft of the present application, the empennage is fixedly provided with a first shaft body and a second shaft body parallel to the first shaft body, the rocker arm is rotatably provided at the first shaft body, the drive arm is rotatably provided at the second shaft body, the base of the tilt drive device is provided on the second shaft body, and a drive of the tilt drive device is fixed to the driven arm.

In an example of a vertical take-off and landing aircraft of the present application, a holding structure is provided between the first shaft body and the second shaft body, one end of the holding structure is fixedly connected to the base, and another end of the holding structure is configured to surround and hold the first shaft body.

In an example of a vertical take-off and landing aircraft of the present application, the first shaft body and/or the second shaft body are hollow shaft bodies.

In an example of a vertical take-off and landing aircraft of the present application, the ruddervators includes control surface and drive device, the control surface is rotatably connected to the empennage or a tail of the fuselage, and the drive device is configured to drive the control surface to rotate to so as to adjust a heading of the vertical take-off and landing aircraft.

In an example of a vertical take-off and landing aircraft of the present application, a roll axis of the vertical take-off and landing aircraft is taken as a reference and is defined as 0°, with the tilting rotor tilting upward as a positive direction and the tilting rotor tilting downward as a negative direction, and a rotation axis of the tilting rotor is configured to tilt within a range of −20° to 110°.

In an example of a vertical take-off and landing aircraft of the present application, the empennage is a forward-swept empennage, and the tilting rotor provided on the forward-swept empennage is a tilting-nacelle rotor.

In an example of a vertical take-off and landing aircraft of the present application, the vertical take-off and landing aircraft further includes a tail fin provided below the forward-swept empennage and connected to the tail of the fuselage.

The present application further provides a control method for a vertical take-off and landing aircraft, and the vertical take-off and landing aircraft includes: a fuselage and 2N tilting rotors. Both sides of the fuselage are provided with a wing symmetrically, a tail of the fuselage is provided with an empennage, and ruddervators are provided at the empennage. 2N tilting rotors are symmetrically provided at both sides of the fuselage, a part of the 2N tilting rotors are provided on the empennage. N is a natural number greater than or equal to 2; in a vertical take-off and landing state, projections of propellers of the 2N tilting rotors on a horizontal plane are centrally symmetrical about point B, the point B and a center of gravity point G of the vertical take-off and landing aircraft are both provided in a symmetry plane of the fuselage, and the point B is provided at a side of the point G close to the empennage; during the transition flight of the vertical take-off and landing aircraft, both the point G and the point B is configured to move along the symmetry plane, and the point B is always provided at the side of point G close to the empennage. Specifically, in the process that the vertical take-off and landing aircraft transitions from the vertical take-off and landing state to the cruising state, both point G and point B move along the symmetry plane toward the side close to the nose, and point B is always located at the side of point G close to the empennage. The control method includes the following pitch control process:

- allocating a pitch control distribution between the ruddervators and the 2N tilting rotors according to a current airspeed or a dynamic pressure; and
- controlling the ruddervators and the 2N tilting rotors respectively according to the pitch control distribution to achieve pitch trim and maneuver.

In an example of a control method of the present application, before the allocating the pitch control distribution between the ruddervators and the 2N tilting rotors according to the current airspeed or dynamic pressure, further including following rotor control process:

- obtaining a current tilt position of each tilting rotor;
- in response to the current tilt position being inconsistent with a set cruise position, obtaining a current airspeed or a dynamic pressure of a corresponding tilting rotor at the current tilt position, and determining whether the current airspeed or the dynamic pressure is equal to or greater than a preset threshold value at the current tilt position;
- in response to the current airspeed or the dynamic pressure being equal to or greater than the preset threshold value at the current tilt position, controlling the tilting rotor to tilt to a preset next position; and
- increasing rotation speeds of the 2N tilting rotors gradually.

In an example of a control method of the present application, the vertical take-off and landing aircraft further includes 2M fixed rotors, with M is a natural number greater than or equal to 2; the 2M fixed rotors are symmetrically provided at the wings on both sides of the fuselage and provided at the outer side of the tilting rotors; and in a process of increasing rotation speeds of the 2N tilting rotors gradually, further including: reducing rotation speeds of the 2M fixed rotors to a set rotation speed gradually.

In an example of a control method of the present application, before the controlling rotor, further including following take-off control process:

- tilting the 2N tilting rotors to a rotation axis vertically upward or tilted upward;
- deflecting the ruddervators downward; and
- starting the 2M fixed rotors and the 2N tilting rotors, and issuing a horizontal flight command in response to the vertical take-off and landing aircraft reaching a set altitude.

In an example of a control method of the present application, the vertical take-off and landing aircraft further includes 2M fixed rotors, and the 2M fixed rotors are distributed around the 2N tilting rotors; before the allocating the pitch control distribution between the ruddervators and the 2N tilting rotors according to the current airspeed or the dynamic pressure, further including following take-off control process:

- tilting the 2N tilting rotors to a rotation axis horizontally forward;
- deflecting the ruddervators downward; and
- starting the 2M fixed rotors and the 2N tilting rotors, and issuing a horizontal flight command in response to the vertical take-off and landing aircraft reaching a set altitude.

In an example of a control method of the present application, after the take-off control process, before the pitch control, further including following rotor control process: gradually increasing rotation speeds of the 2N tilting rotors, issuing a forward flight command and gradually reducing rotation speeds of 2M fixed rotors to a set rotation speed.

In an example of a control method of the present application, during a rotor control process, after gradually reducing the rotation speeds of the 2M fixed rotors to the set rotation speed, further including: controlling the ruddervators to return to zero according to the current airspeed or the dynamic pressure, and gradually participating in the pitch control process.

In an example of a control method of the present application, before the take-off control process, further including a ground preparation process, and the ground preparation process includes: starting up the vertical take-off and landing aircraft, performing system power-on detection, and confirming full stroke status of a servo system.

In an example of a control method of the present application, the controlling the ruddervators and the 2N tilting rotors respectively according to the pitch control distribution to achieve pitch trim and maneuver includes: differentially adjusting a pitch moment to perform the pitch trim and maneuver by a tilt speed difference between the tilting rotors at different positions and/or a tilt angle difference between the tilting rotors at different positions and/or a rotation speed difference between the tilting rotors at different positions.

In an example of a control method of the present application, the control method further includes: executing the rotor control process and the pitch control process repeatedly in sequence until the tilting rotor is tilted to a cruise position, and a transition from a take-off to a horizontal flight is completed.

The vertical take-off and landing aircraft of the present application is provided with an elevator and 2N tilting rotors. In the vertical take-off and landing state, the projections of the propellers of the 2N tilting rotors on the horizontal plane are centrally symmetric about point B, point B and the center of gravity point G of the vertical take-off and landing aircraft are both located in the symmetry plane of the fuselage, and point B is located at the side of point G close to the empennage. During the transition flight process of the vertical take-off and landing aircraft, point B is always located at the side of point G close to the empennage. With this configuration, the center of gravity point G of the vertical take-off and landing aircraft and the symmetry center point B of the tilting rotors do not coincide with each other, and both the point G and the point B move toward the side close to the nose along the symmetry plane in the process of the vertical take-off and landing aircraft transitioning from the vertical take-off and landing state to the cruising state. Therefore, the moment of the pulling force generated by the tilting rotor in front of the center of gravity on the center of gravity point G is relatively small, and the moment of the pulling force generated by the tilting rotor in the rear of the center of gravity on the center of gravity point G is relatively large, and the moment difference between the front and rear tilting rotors can resist part of the nose-up moment generated by the tilting rotor wash area on the empennage acting on the empennage, thereby reducing the difficulty of pitch control. Therefore, when the tilting rotors on front and rear sides of the center of gravity G have the same speed throttle, the difference in the length of the lever arm to the center of gravity G will generate a nose-down moment, which can offset or partially offset the nose-down moment generated by the tilting rotor wash area on the empennage. Therefore, the vertical take-off and landing aircraft can better balance the pitch moment when the front and rear rotor throttles are consistent.

The control method of the present application allocates the pitch control distribution between the ruddervators and the 2N tilting rotors according to the current airspeed or dynamic pressure, and can realize the pitch control by the ruddervators and the 2N tilting rotors. Therefore, the present application effectively overcomes some practical problems in the prior art and has high utilization value and use significance.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those skilled in the art.

DETAILED DESCRIPTION OF THE EMBODIMENTS

The following is an explanation of the embodiments of the present application by specific examples. Those skilled in the art can easily understand other advantages and effects of the present application from the contents disclosed in this specification. The present application can also be implemented or applied by other different specific embodiments, and the details in this specification can also be modified or changed based on different viewpoints and applications without deviating from the spirit of the present application. It should be noted that the following embodiments and the features in the embodiments can be combined with each other without conflict. It should also be understood that the terms used in the embodiments of the present application are to describe specific embodiments, not to limit the scope of the present application. The test methods in the following examples that do not specify specific conditions are usually carried out under conventional conditions or under conditions recommended by various manufacturers.

When the examples give a numerical range, it should be understood that unless otherwise specified in the present application, the two endpoints of each numerical range and any value between the two endpoints can be selected. Unless otherwise defined, all technical and scientific terms used in the present application are in accordance with the prior art mastery and the records of the present application by the technicians in this field, and any methods, equipment and materials of the prior art similar to or equivalent to the methods, equipment and materials in the embodiments of the present application can also be used to implement the present application.

It should be noted that the terms such as "upper", "lower", "left", "right", "middle" and "one" cited in this specification are only for the convenience of description, and are not used to limit the scope of the present application. The change or adjustment of the relative relationship shall also be regarded as the scope of the present application without substantial change of the technical content.

Referring to FIG. 1 to FIG. 34, the present application first provides a vertical take-off and landing aircraft. The vertical take-off and landing aircraft is provided with 2N tilting rotors symmetrically arranged at the periphery of the fuselage 10, and an elevator is provided on the empennage 30. The positional relationship between the 2N tilting rotors and the center of gravity can be used to improve the control of the pitch moment of the vertical take-off and landing aircraft under a complex interference flow field, thereby improving the control problem caused by the airflow interference between the tilting rotor on the empennage 30 and the empennage 30 in the existing vertical take-off and landing aircraft.

Figure 7:
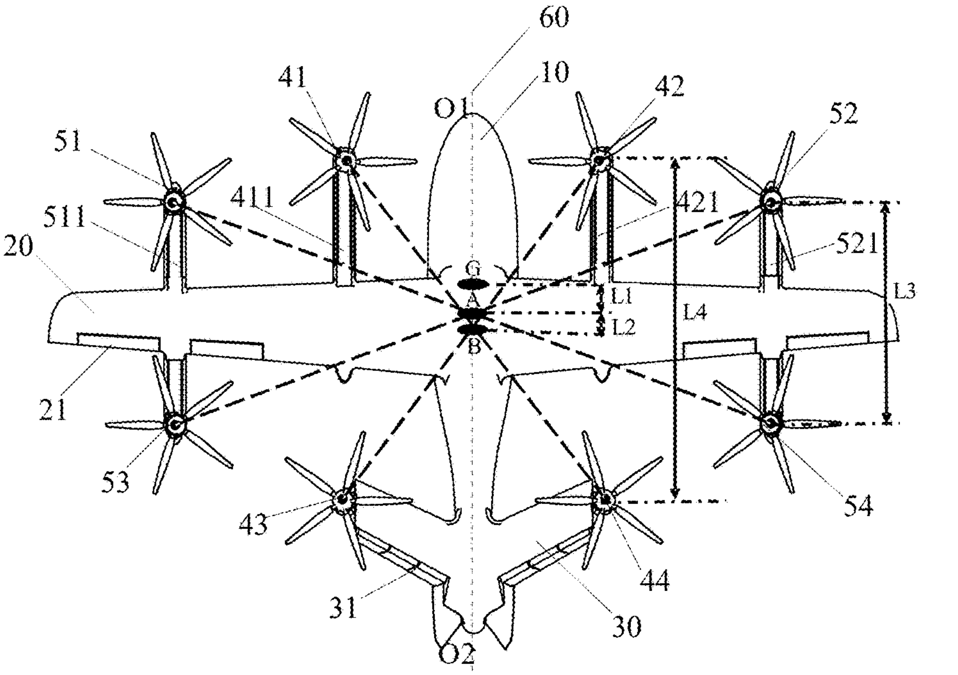
FIG. 7 is a top view of a vertical take-off and landing aircraft in a vertical take-off and landing state according to yet another embodiment of the present application.
Figure 8:
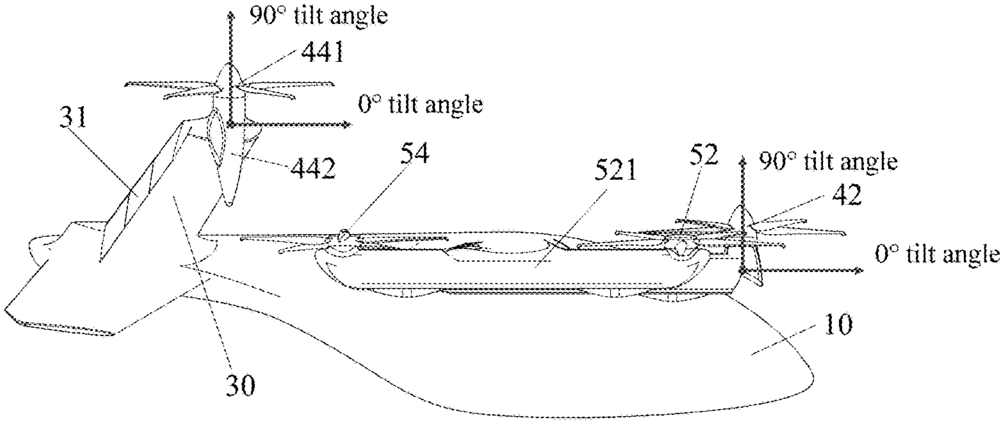
FIG. 8 is a side view of a vertical take-off and landing aircraft in a vertical take-off and landing state according to yet another embodiment of the present application.

Referring to FIG. 1 to FIG. 7, the present application provides a vertical take-off and landing aircraft. The vertical take-off and landing aircraft includes: a fuselage and 2N tilting rotors. The fuselage 10 is a symmetrical structure and has a symmetry plane 60 (i.e., the vertical plane where the straight line O1-O2 in FIG. 7 is located) extending along the length direction of the fuselage 10. The remaining structure and shape of the fuselage 10 are not limited and can refer to the structure of the fuselage 10 of an existing vertical take-off and landing aircraft. The fuselage 10 includes conventional aircraft operating systems such as an avionics system, a flight control system, an electrical system, and a navigation system, which will not be described in detail here. Wings 20 are arranged at both sides of the fuselage 10. The wings 20 at both sides are symmetrical about the symmetry plane 60 of the fuselage 10. The structure of the wings 20 can also refer to the fixed wing structure of an existing aircraft, which will not be described in detail here. The tail of the fuselage 10 is provided with an empennage 30, which is integrally formed with or mechanically connected to the fuselage 10 and symmetrically arranged relative to a symmetry plane 60 of the fuselage 10. The empennage 30 is provided with ruddervators 31, and the installation position and structure of the ruddervators 31 can be various, for example, it can be arranged at any suitable position on the empennage 30, and can also be any existing suitable ruddervators structure.

Crucially, referring to FIG. 7, 2N tilting rotors are installed on both sides of the fuselage 10, N is a natural number greater than or equal to 2, the 2N tilting rotors are symmetrically arranged about the symmetry plane 60 of the fuselage 10, and a part of the 2N tilting rotors are installed on the empennage 30. In a vertical take-off and landing state, projections of propellers of the 2N tilting rotors on a horizontal plane are centrally symmetrical about point B, the point B and a center of gravity point G of the vertical take-off and landing aircraft are both provided in a symmetry plane of the fuselage, and the point B is provided at a side of the point G close to the empennage; during the transition flight of the vertical take-off and landing aircraft, both the point G and the point B is configured to move along the symmetry plane, for example, point G and point B both move along the symmetry plane toward the side close to the nose in the process of the transition from the vertical take-off and landing state to the cruising state; the point B is always provided at the side of point G close to the empennage.

With the above arrangement, the center of gravity point G of the vertical take-off and landing aircraft and the symmetry center point B of the 2N tilting rotors do not coincide with each other, and both the point G and the point B move toward the side close to the nose along the symmetry plane 60 in the process of the vertical take-off and landing aircraft transitioning from the vertical take-off and landing state to the cruising state. Therefore, the moment of the pulling force generated by the tilting rotor in front of the center of gravity on the center of gravity point G is relatively small, and the moment of the pulling force generated by the tilting rotor in the rear of the center of gravity on the center of gravity point G is relatively large, and the moment difference between the front and rear tilting rotors can resist part of the nose-up moment generated by the tilting rotor wash area on the empennage 30 acting on the empennage, thereby reducing the difficulty of pitch control. Therefore, when the tilting rotors on front and rear sides of the center of gravity G have the same speed throttle, the difference in the length of the lever arm to the center of gravity G will generate a nose-down moment, which can offset or partially offset the nose-down moment generated by the tilting rotor wash area on the empennage. Therefore, the vertical take-off and landing aircraft can better balance the pitch moment when the front and rear rotor throttles are consistent.

The vertical take-off and landing aircraft of the present application, in various states, such as the cruising state for horizontal flight, the vertical take-off state for vertical takeoff and landing, and the transition state (including the transition of the vertical take-off state to the cruising state and the transition of the cruising state to the vertical take-off state), the rotation axis between the tilting rotors can be set in parallel or not in parallel. In some embodiments, during flight, a rotation axis of any tilting rotor on the empennage 30 and a rotation axis of any tilting rotor at other positions have projections that are not parallel on the symmetry plane 60 of the fuselage 10, and the non-parallel rotation axes enable different tilting rotors to provide moments in different directions, thereby controlling the overall pitch moment of the vertical take-off and landing aircraft.

Although the tilt speeds of the tilting rotors may be the same, so that pitch control is performed by other means, in an embodiment of the vertical take-off and landing aircraft of the present application, in various states, such as the cruising state for horizontal flight, the vertical take-off state for vertical take-off and landing, and the transition state (including the transition of the vertical take-off state to the cruising state and the transition of the cruising state to the vertical take-off state), the tilt speed of any tilting rotor on the empennage 30 and the tilt speed of any tilting rotor at other positions have a first difference, and the first difference is not equal to 0. By setting a threshold value of the first difference, the pitch force of the vertical take-off and landing aircraft in various states can be adjusted by tilting of the tilting rotor to obtain a relatively large pitch control moment.

Although the rotation speeds of the tilting rotors can be the same, the pitch control is performed by other means. In an embodiment of the vertical take-off and landing aircraft of the present application, in various states, such as the cruising state for horizontal flight, the vertical take-off state for vertical take-off and landing, and the transition state (including the transition of the vertical take-off state to the cruising state and the transition of the cruising state to the vertical take-off state), a rotation speed of any tilting rotor on the empennage and a rotation speed of any tilting rotor at other positions have a second difference, and the second difference is not equal to 0. By setting the threshold of the second difference, the pitch force of the vertical take-off and landing aircraft in various states can be adjusted by the rotation speed of the tilting rotor to obtain a relatively large pitch control moment. It should be noted that the first difference of the tilt speed of the front tilting rotor (the tilting rotor located on the tail 30 and the tilting rotor heading forward) and the tilting rotor on the empennage 30 can also be combined with the second difference of the rotation speed of the front tilting rotor and the tilting rotor on the empennage 30, so as to achieve multiple strategies of pitch moment control.

Although the present application can include only 2N tilting rotors as described in FIG. 1 to FIG. 4, referring to FIG. 7, in another embodiment of the present application, the vertical take-off and landing aircraft further includes 2M fixed rotors, with M is a natural number greater than or equal to 2, and M can be the same as N or different from N. The 2M fixed rotors are symmetrically provided at the wings on both sides of the fuselage and provided at the outer side of the tilting rotors. In the vertical take-off and landing state, projections of all the fixed rotors on the horizontal plane are centrally symmetrical about point A, the point A is provided in the symmetry plane of the fuselage, and coincides with point G or is located at the side of point G close to the empennage. In the process of the vertical take-off and landing aircraft transitioning from the vertical take-off and landing state to the cruising state, point G and point B move along the symmetry plane toward the side close to the nose, the point G is provided at a side of the point A close to a nose or the point G coincides with the point A, and the point B is always provided at a side of the point A close to the empennage.

Specifically, with the nose of the vertical take-off and landing aircraft facing forward, the center point B of the 2N tilting rotors is located at the rear side of the center point A of the 2M fixed rotors, the distance from point A to point B is L2, and L2>0; as the 2N tilting rotors tilt forward, the center of gravity of the 2N tilting rotors, the center of gravity G of the vertical take-off and landing aircraft and the symmetry center point B will move toward the direction close to the nose; during the entire tilting process from the preset vertical take-off and landing position (for example, a 90° tilt angle) of the 2N tilting rotors to the preset cruise position (for example, a 0° tilt angle), L2>0 all the time. At the same time, the center of gravity G of a vertical take-off and landing aircraft is located in front of the symmetry center B of the 2N tilting rotors, and also located in front of the symmetry center A of the 2M fixed rotors; the distance from point A to point G is L1, L1≥0; as the 2N tilting rotors tilt forward, the center of gravity G gradually moves forward, and the absolute value of L1 becomes larger and larger. Under this configuration, the center of gravity of the vertical take-off and landing aircraft and the symmetry center of the fixed rotor or the symmetry center of the tilting rotor do not coincide with each other, and in the process of the vertical take-off and landing aircraft transitioning from the vertical take-off and landing state to the cruising state, both point G and point B move along the symmetry plane toward the side close to the nose, and point G is located at the side of point A close to the nose or coincides with point A, and point B is always located at the side of point A close to the empennage 30, so the pulling force generated by the tilting rotor and the fixed rotor in front of the center of gravity has a relatively small moment on the center of gravity point G, and the pulling force generated by the tilting rotor and the fixed rotor in the rear of the center of gravity has a relatively large moment on the center of gravity point G, and the moment difference between the front rotors and rear rotors can resist part of the nose-up moment caused by the tilting rotor wash area at the empennage on the empennage, thus reducing the difficulty of pitch control. Therefore, when the fixed rotors or tilting rotors on front and rear sides of the center of gravity G have the same throttle speed, a nose-down moment will be generated due to the difference in the length of the lever arm to the center of gravity G. The nose-down moment can be used to offset or partially offset the nose-up moment generated by the tilting rotor wash area at the empennage on the empennage, so that the vertical take-off and landing aircraft can better balance the pitch moment when the throttles of the front rotors and rear rotors are consistent.

Furthermore, during the tilt transition stage of the tilting rotor, due to aerodynamic interference, the vertical take-off and landing aircraft will also generate an additional larger nose-up moment, and during the tilt process of the tilting rotor, the center of gravity G of the vertical take-off and landing aircraft gradually moves toward the nose during the tilt process, and the symmetry center B of the tilting rotor also gradually moves forward of the nose. Since the center of gravity G is always in front of point B, the moment difference between the tilting rotor in front of the center of gravity G and the tilting rotor behind the center of gravity G during the entire tilt stage can also generate a part of the nose-down moment, thereby offsetting or partially offsetting the nose-up moment caused by aerodynamic interference.

Furthermore, in the tilt stage and the cruise stage, the center of gravity point G is close to the front side relative to point A and point B, and point B is always located on the side of point A close to the empennage 30, so it has a relatively large longitudinal and heading static stability margin, and the aircraft has a stronger ability to resist extreme windy weather, and the flight is safer.

Figure 26:
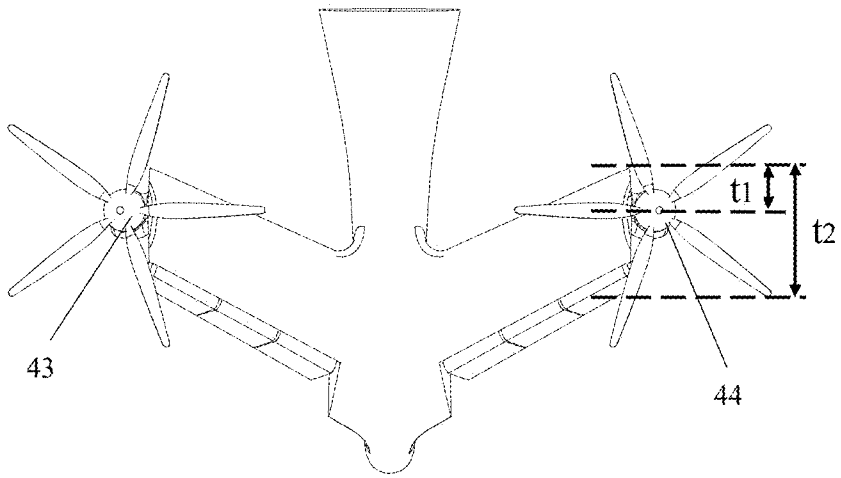
FIG. 26 is a top view of an empennage in a vertical take-off and landing state of an aircraft.

Referring to FIG. 26, in an embodiment of the vertical take-off and landing aircraft of the present application, the empennage 30 is a V-shaped tail, a third tilting rotor 43 is installed on the upper tip of one side of the V-shaped tail, a fourth tilting rotor 44 is installed on the upper tip of the other side of the V-shaped tail, and the third tilting rotor 43 and the fourth tilting rotor 44 are symmetrical about the fuselage symmetry plane 60. In the vertical take-off and landing state, along a direction parallel to the roll axis X of the aircraft, a distance between a rotation center of the tilting rotor on the empennage and a leading edge of the upper tip of the V-shaped tail is t1, and a chord length of the upper tip of the V-shaped tail is t2, and a ratio of t1 to t2 is 15% to 40%. According to the structural strength stress analysis of the upper tip of the empennage 30, the tilt mechanism is connected to the upper tip of the empennage 30 within this range, the thickness of the empennage 30 is relatively thick, and the stress condition of the empennage 30 is better.

In an embodiment of the vertical take-off and landing aircraft of the present application, the tilting rotor provided on the empennage is a tilting-nacelle rotor; the tilting rotor provided outside the empennage is a tilting-propeller rotor. In other embodiments, the tilting rotor located outside the empennage may also be a tilting-nacelle rotor. In particular, when the tilting rotor is installed on the wing tip of the wing, the tilting rotor located on the wing tip of the wing may also be a tilting-nacelle rotor. Existing tilting rotors mostly include a rotor and a power pod 442, a motor and control components may be installed in the power pod 442. The above-mentioned “tilting-propeller rotor” mostly cuts off the power pod 442; during the tilting process of the rotor, the part close to the rotor tilts together with the rotor, and the part far away from the rotor is relatively fixed to the fuselage 10. In the above-mentioned “tilting-nacelle rotor”, the entire power pod 442 tilts together with the corresponding rotor. It should be noted that if the installation conditions permit, the 2N tilting rotors can all be tilting-nacelle rotors, but considering that on the existing empennage 30 the front fuselage 10 or the wing 20, the tilting rotor is mostly installed on the wing boom. Referring to FIG. 1 to FIG. 6, in the embodiment of the present application, the tilting rotor on the empennage 30 is a tilting-nacelle rotor, and the tilting rotor on the fuselage 10 or the wing 20 in front of the empennage 30 is a tilting-propeller rotor. The specific position and installation method of the tilting-propeller rotors on the wing 20 or the fuselage 10 may not be limited. For example, it can be directly installed on the wing 20, or it can be installed on the wing 20 or the fuselage 10 by the wing boom.

2N tilting rotors are symmetrically arranged around the fuselage 10, and a tilting rotor with a full-tilt structure is arranged on the empennage 30. Since the tilting-nacelle rotors are rotatably installed on the empennage 30 by the power pod 442, when the tilting-nacelle rotors tilt, the power pod 442 follows the synchronous tilting, and the power pod 442 on the empennage 30 is always on the same rotation axis as the rotor, which makes the shielding area of the power pod 442 immersed in the corresponding rotor relatively small when the vertical take-off and landing aircraft is hovering, the area where the downwash of the rotor hits the empennage 30 is relatively small, the mutual interference between the airflow generated by the rotor and the airflow generated by the empennage 30 is less, the nose-up moment of the aircraft is reduced when hovering, and the control of the pitch moment of the vertical take-off and landing aircraft in a complex interference flow field is simpler.

Figure 10:
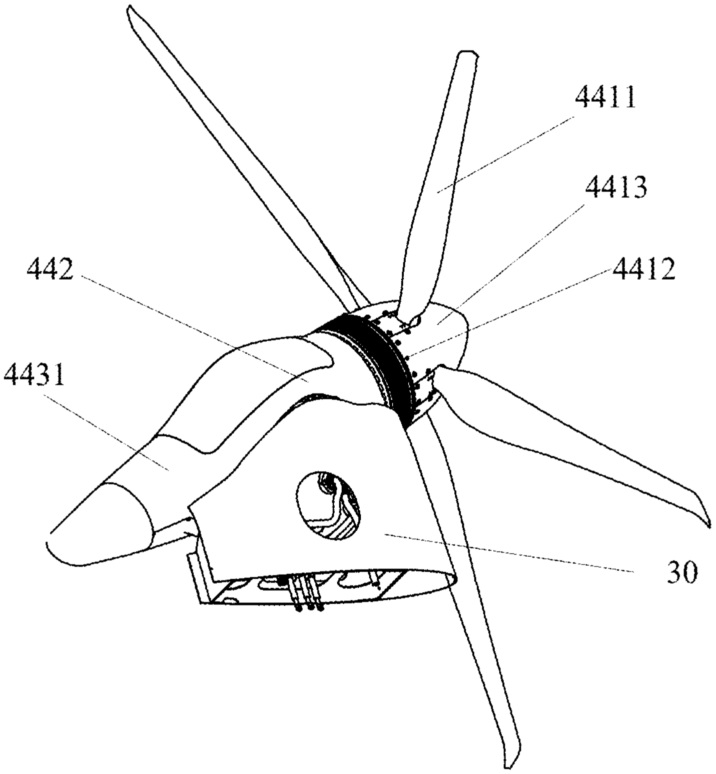
FIG. 10 is a partial view of a tilting-nacelle rotor.
Figure 11:
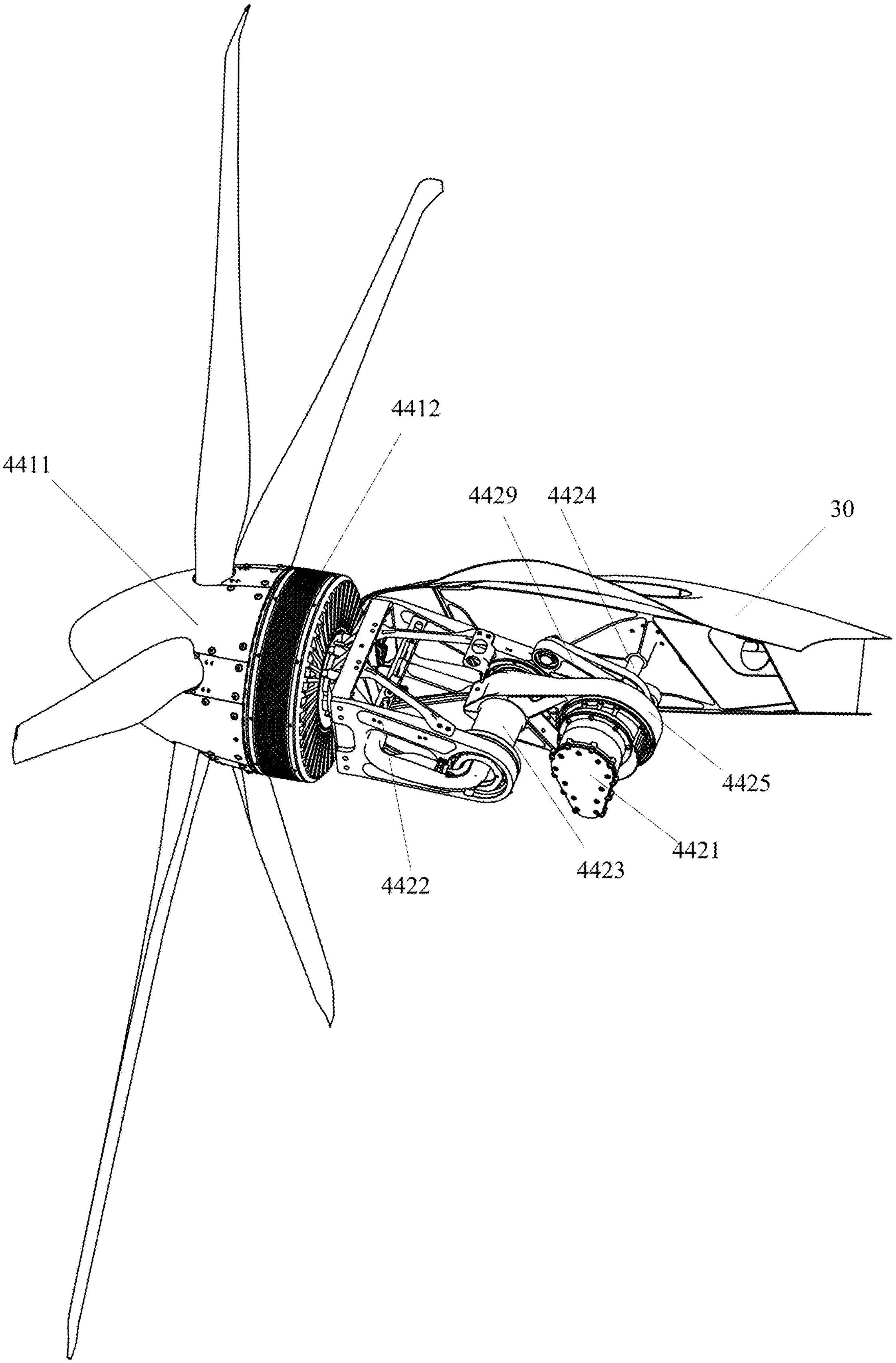
FIG. 11 is a partial view of a tilting-nacelle rotor after removing a pod shell.
Figure 18:
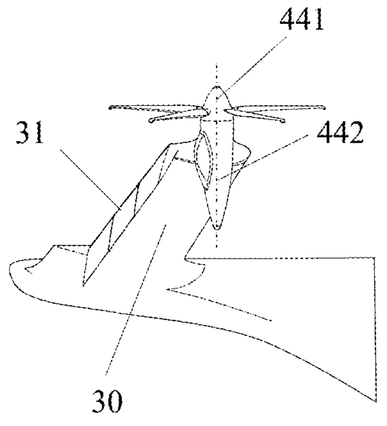
FIG. 18 is a partial view of a tilting-nacelle rotor on an empennage in a vertical take-off state, and a chord length of a control surface accounts for 30%.

The tilting-nacelle rotors structure in the present application can be any existing tilting rotor structure that can realize the power pod 442 as a whole to tilt synchronously with the rotor. Referring to FIG. 10 and FIG. 18, in an embodiment of the vertical take-off and landing aircraft of the present application, the tilting-nacelle rotor includes a first rotor 441 and a power pod 442, the first rotor 441 is connected to the power pod 442, the power pod 442 is rotatably connected to the empennage 30 or the wing 20, and the power pod 442 tilts synchronously with the first rotor 441 during tilting process of the first rotor 441. The shell of the power pod 442 contains a power device. For example, if it is a pure electric configuration, it may include a motor, an electric control, an environmental control device, a tilt mechanism, etc.; if it is an oil-powered configuration, the pod contains an engine, an ECU, a tilt mechanism, etc. Certainly, this solution is preferably a pure electric configuration.

Referring to FIG. 10, in an embodiment of the vertical take-off and landing aircraft of the present application, a fairing 4413 is provided at the center of the first rotor 441. The fairing 4413 is installed at the windward side of the first rotor 441 and is used to reduce airflow resistance. In an embodiment, along the extension direction of the rotation axis of the first rotor 441, the projection of the fairing 4413 covers the projection of the power pod 442. This arrangement can reduce the influence of the power pod 442 on the downwash area of the rotor during flight. However, it can be understood by those skilled in the art that the projection of the power pod 442 can also be partially located within the projection of the fairing 4413, which can also play a role in partially reducing the resistance, but the effect is weaker than the former full coverage.

The shape of the power pod 442 includes but is not limited to a rotating body, a square body, an ellipsoid, etc. In an embodiment of the vertical take-off and landing aircraft of the present application, the power pod 442 is a rotating body structure, and the rotating axis of the rotating body structure is coaxially arranged with the rotating axis of the first rotor 441; the surface of the power pod 442 is streamlined. In this way, the influence of the power pod 442 on the corresponding downwash area of the rotor during flight can be reduced.

Referring to FIG. 10 to FIG. 17, the first rotor 441 includes a propeller 4411 and a rotary drive device 4412, and the propeller 4411 is provided on an output shaft of the rotary drive device 4412; the power pod includes 442 a pod shell 4431 and a tilt mechanism provided in the pod shell 4431, the tilt mechanism is configured to drive the rotary drive device 4412 to tilt. The tilt mechanism in the present application can be any suitable tilt mechanism type that can drive the power pod 442 and the rotary drive device 4412 to tilt synchronously. In the present embodiment, the tilt mechanism includes: a rocker arm 4422, a drive arm 4429, a tilt drive device 4421 and a connect rod 4426. The tilt drive device 4421 can be any suitable structural type having a rotating output shaft, for example, a servo, a combination of a servo and a reducer, etc. In the present application, the tilt drive device 4421 is a servo. The rocker arm 4422 is rotatably provided at the empennage 30, and one end of the rocker arm 4422 close to the rotary drive device 4412 is fixedly connected to the rotary drive device 4412; a drive arm 4429 is rotatably provided at the empennage 30, and a rotation axis of the drive arm 4429 is arranged parallel to the rotation axis of the rocker arm 4422; a base of the tilt drive device 4421 is fixedly provided at the empennage 30, and a drive end of the tilt drive device 4421 is configured to drive the drive arm 4429 to rotate; one end of the connect rod 4426 is hinged to the rocker arm 4422 by a first hinge shaft 4427, and the other end of the connect rod 4426 is hinged to the drive arm 4429 by a second hinge shaft 4428. Although the positions of the first hinge axis 4427 and the second hinge axis 4428 may not be provided with bearings 4430, but in an embodiment, a bearing 4430 is provided between the connect rod 4426 and the first hinge axis 4427, and a bearing 4430 is also provided between the connect rod 4426 and the second hinge axis 4428, so that the tilting process can be more stable. The tilt mechanism can realize a double-axis connection structure with the empennage 30 by the rotating shaft of the rocker arm 4422 and the rotating shaft of the drive arm 4429, and the moment borne by the tilt mechanism can be increased by increasing the axis spacing between the rotating shaft between the rocker arm 4422 and the empennage 30 to the rotating shaft between the drive arm 4429 and the empennage 30 to reduce the force borne by the single rod, the mechanism has a stronger anti-torsion ability, and the support stiffness of the mechanism is improved. In addition, this setting can use a single-side support method to fix the tilt mechanism on the aircraft, and reduce the drive requirements by the four-link connect rod mechanism. At the same time, it is also very convenient to adjust the length ratio among the four-link connect rods to adjust the stiffness of the entire mechanism and adjust the natural frequency.

Referring to FIG. 11 to FIG. 17, in an embodiment, the empennage 30 is fixedly provided with a first shaft body 4423 and a second shaft body 4424 parallel to the first shaft body 4423, one end of the first shaft body 4423 and one end of the second shaft body 4424 are fixed on the upper tip of the empennage 30, and the other end of the first shaft body 4423 and the other end of the second shaft body 4424 are cantilevered out. The rocker arm 4422 is rotatably provided at the first shaft body 4423 by a bearing 4430, the drive arm 4429 is rotatably provided at the second shaft body 4424 by a bearing 4430. The base of the tilt drive device 4421 is rotatably installed on the first shaft body 4423 by a holding structure 4425, and is positioned along the axial direction of the first shaft 4423. The drive end of the tilt drive device 4421 is coaxial with the second shaft body 4424 and fixedly connected with the drive arm 4429. With this arrangement, on one hand, the positioning installation of the tilt drive device 4421 can be achieved by the holding structure 4425 and the second shaft body 4424, and on the other hand, it can also reduce the difficulty of installing the tilt mechanism in the shell of the power pod 442, and improve the single-sided installation stability of the tilting-nacelle rotors. It should be noted that in other embodiments, the tilt drive device 4421 can also be fixedly set on the empennage 30, and the output shaft of the tilt drive device 4421 can be extended and fixedly connected with the drive arm 4429, so as to drive the connect rod 4426 to drive the rocker arm 4422 to tilt. However, compared with the present embodiment, this arrangement will occupy a relatively large space inside the empennage 30, and is not suitable for situations where the wing profile is relatively thin or there are more internal devices. At the same time, it will cause the moment exerted on the tilt drive device 4421 to ultimately be borne entirely by the mounting seat of the tilt drive device 4421, which has relatively great requirements on the installation strength of the tilt drive device 4421.

Figure 15:
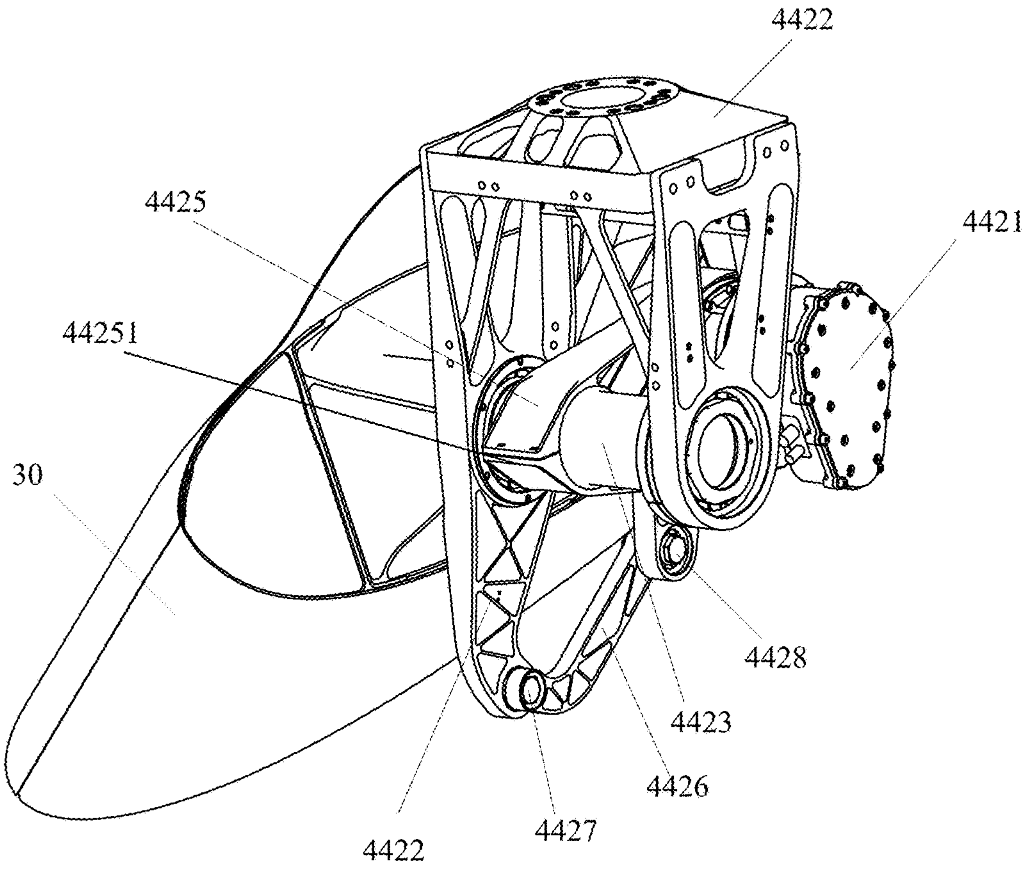
FIG. 15 is a three-dimensional view in another direction of a tilting-nacelle rotor after removing a pod shell.
Figure 16:
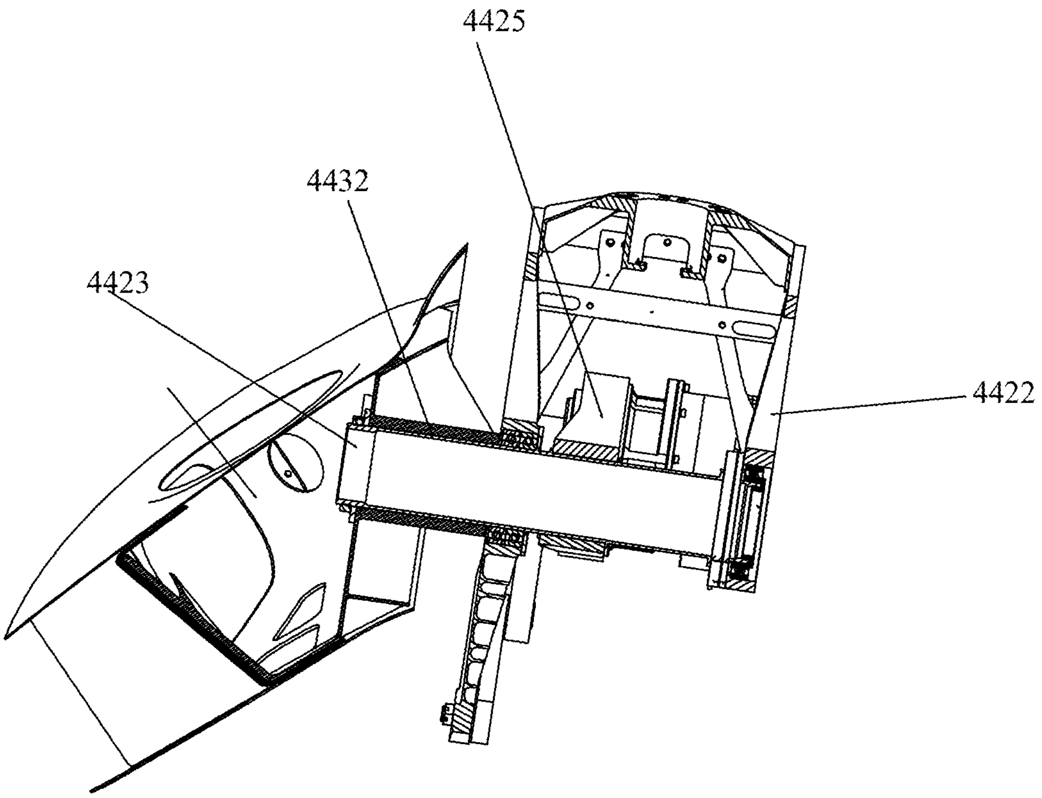
FIG. 16 is an F-F cross-sectional view of FIG. 14.
Figure 17:
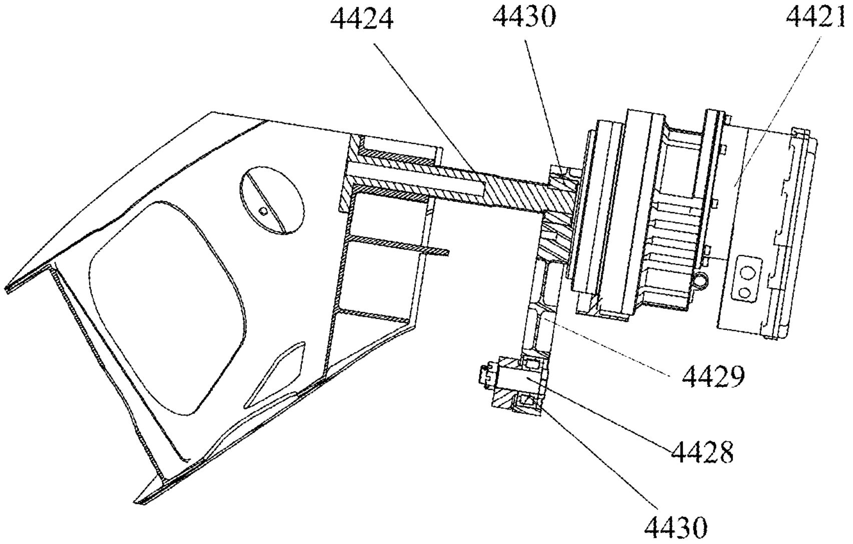
FIG. 17 is a P-P cross-sectional view of FIG. 14.

Referring to FIG. 11 to FIG. 17, the first shaft body 4423 and the second shaft body 4424 can also be limited to each other by the holding structure 4425, thereby strengthening the structural strength of the first shaft body 4423 and the second shaft body 4424 provided on the empennage 30, so that the first shaft body 4423 and the second shaft body 4424 maintain a parallel position relationship with each other on the empennage 30, ensuring that the driving device and the rocker arm 4422 maintain the same horizontal plane during the tilt driving process, thereby realizing stable tilt driving of the rocker arm 4422 by the driving device. One end of the holding structure 4425 is fixedly connected to the base of the tilt drive device 4421. Specifically, one end of the holding structure 4425 is arranged around the periphery of the base of the tilt drive device 4421. More specifically, one end of the holding structure 4425 is fixedly connected to the base of the tilt drive device 4421 and is coaxially installed on the second shaft body 4424; the other end of the holding structure 4425 surrounds and tightly holds the first shaft body 4423. Specifically, as shown in FIG. 15, the other end of the holding structure 4425 is interference fit on the periphery of the first shaft body 4423 to achieve a tight hold and fixation with the first shaft body 4423. More specifically, a slit 44251 is arranged on the other end of the holding structure 4425, the slit 44251 extends from the outer edge of the other end of the holding structure 4425 to the inner wall that contacts the first shaft body 4423, and the gap of the slit 44251 extends along the axial direction of the first shaft body 4423. The other end of the holding structure 4425 utilizes the elastic expansion and contraction characteristics of the slit 44251 to realize the surrounding and tightening of the first shaft body 4423 with different outer diameters, and expand the tolerance range allowed by the interference fit between the holding structure 4425 and the first shaft body 4423.

In the present application, the first shaft body 4423 and/or the second shaft body 4424 are hollow shaft bodies, through which cables and pipes can be threaded, so as to prevent the cables and pipes from swinging irregularly outside and damaging the cables, and at the same time reduce the range of movement of the cables and pipes to prevent damage to the cables. Considering that the second shaft body 4424 needs to bear a larger load, in some embodiment, the first shaft body 4423 is a hollow shaft body, and the second shaft body 4424 is a solid shaft body. Certainly, in other embodiments, if the second shaft body 4424 can bear a relatively large load, the second shaft body 4424 can also be set as a hollow shaft body, or the first shaft body 4423 and the second shaft body 4424 can both be set as hollow shaft bodies.

Figure 12:
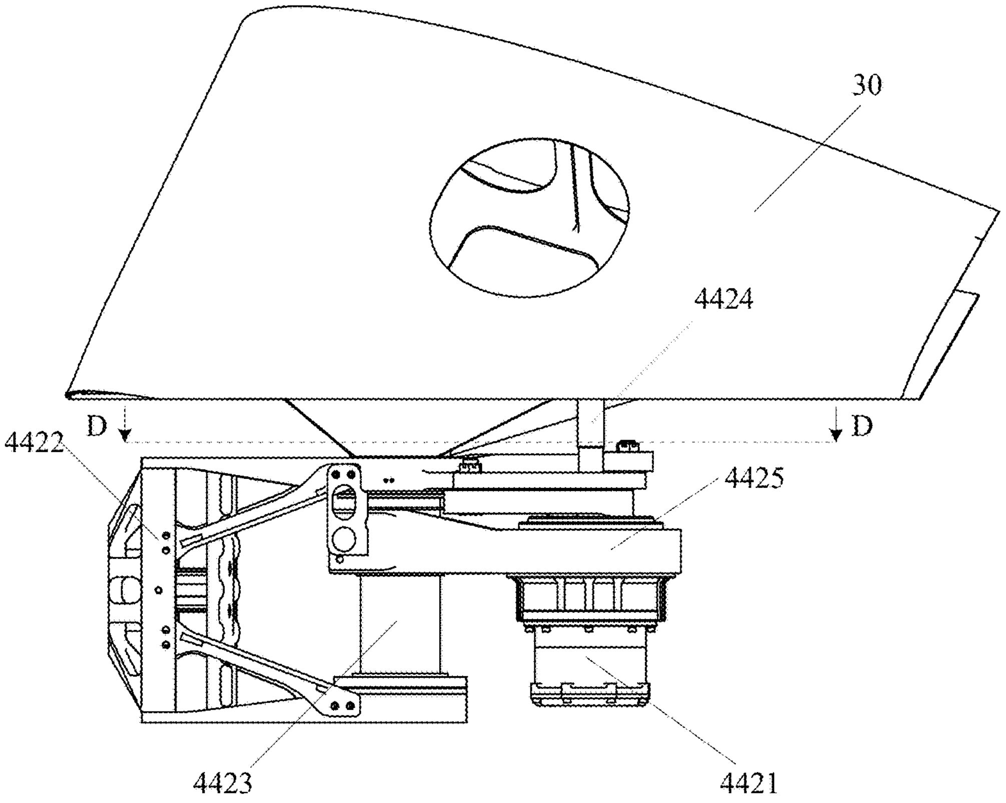
FIG. 12 is a top view of a tilting-nacelle rotor after removing a pod shell.
Figure 13:
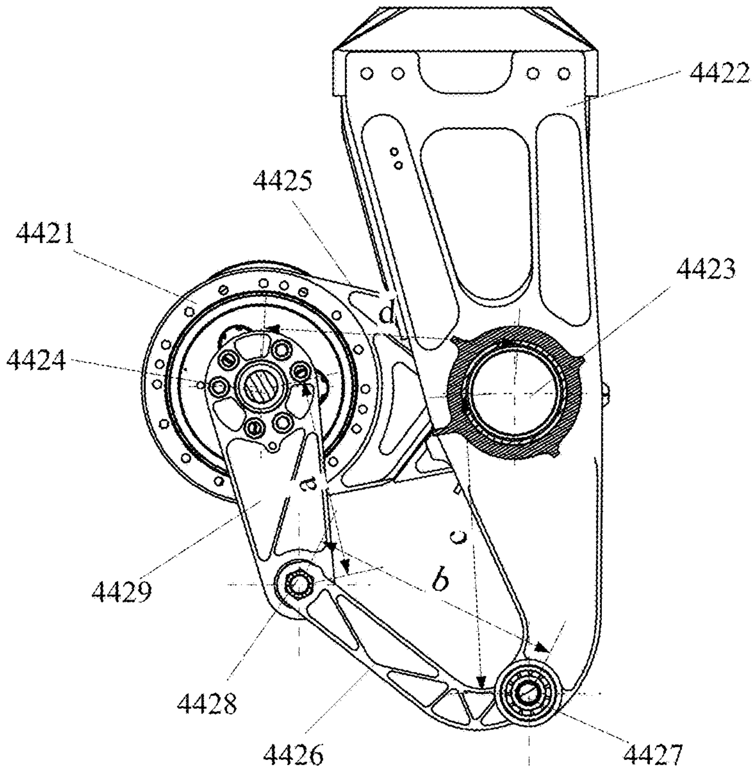
FIG. 13 is a cross-sectional view of D-D in FIG. 12.
Figure 14:
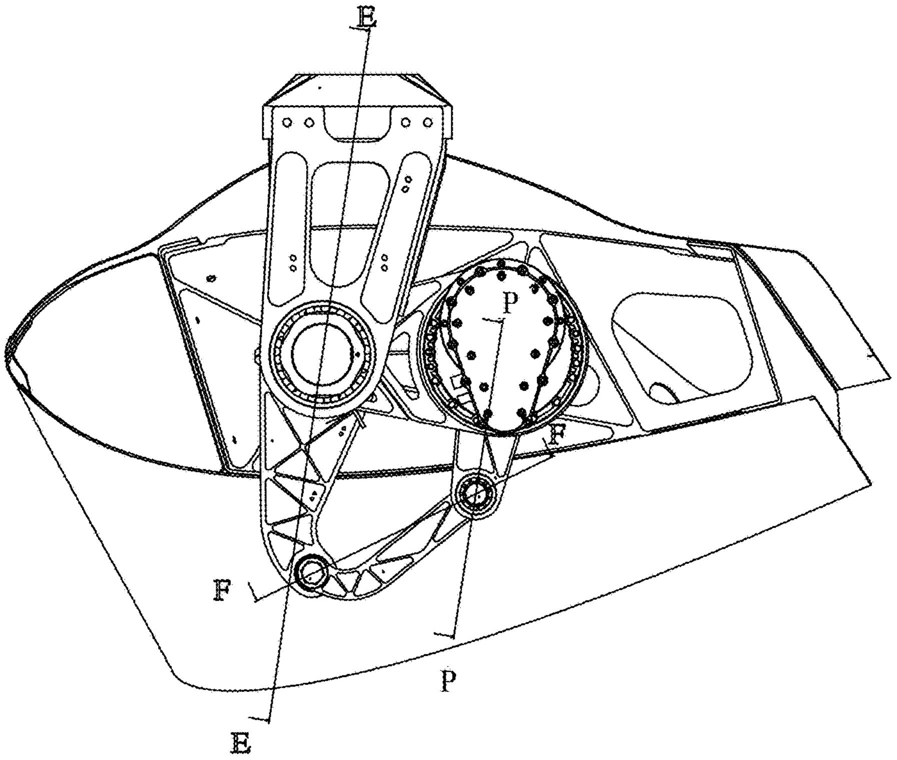
FIG. 14 is a view in another direction of a tilting-nacelle rotor after removing a pod shell.

It should be noted that, considering that the entire tilt mechanism is installed on one side, the relatively long extension distance of the first shaft body 4423 will lead to an increase in the bending moment of the first shaft body 4423. Referring to FIG. 12, in some embodiment, the first shaft body 4423 and the empennage 30 are installed with a mating surface 4432 that is relatively long in the axial direction. This arrangement can increase the installation length of the first shaft body 4423 and the contact area between the first shaft body 4423 and the base of the tilt drive device to balance the bending moment of the first shaft body 4423, thereby reducing the bending deformation of the first shaft body 4423 and improving the installation stability of the entire mechanism.

In an embodiment of the present application, the distance from the rotation center of the tilt drive device 4421 to the axis center of the second hinge shaft 4428 is a, the distance from the axis center of the first hinge shaft 4427 to the axis center of the second hinge shaft 4428 is b, the distance from the center of the first shaft body 4423 to the axis center of the first hinge shaft 4427 is c, and the distance from the center of the first shaft body 4423 to the center of the second shaft body 4424 is d; a is respectively smaller than b, c and d; c is respectively larger than b and d; the sum of a and c is smaller than the sum of b and d. In this way, once the tilt drive device 4421 gets out of control, the output shaft of the tilt drive device 4421 will be in a forward rotation state or a reverse rotation state all the time, and the rocker arm 4422 will swing, that is, the rocker arm 4422 will rotate counterclockwise after rotating clockwise to the extreme position, and will rotate clockwise after rotating counterclockwise to the extreme position. In this way, the activity range of the tilt mechanism is limited, thereby preventing the tilt mechanism from rotating beyond the range and colliding with other parts, and preventing the front propeller from colliding with the fuselage and other structures due to excessive tilt. Therefore, the present application can constrain the tilt angle range of the tilt mechanism by adjusting the length ratio of each component in the tilt mechanism, and at the same time cleverly solve the limit problem of the tilt mechanism, so that the limit position of the forward rotation of the tilt mechanism and the limit position of the reverse rotation are both at the same limit position of the connecting rod. This clever design can not only effectively ensure the safety of the mechanism, but also simplify the design, without the need to additionally set a limit mechanism for limit position limiting, and greatly optimize the installation space of the transmission rod mechanism during the movement process. Specifically, by adjusting the length ratio of each component in the connect rod mechanism, the end axis of the drive arm 4429 (i.e., the axis of the second articulated shaft 4428) in the initial angle state (i.e., the minimum tilt angle) and the final angle state (i.e., the maximum tilt angle) are equal to the distance between the axis of the first shaft body 4423, and at this time, the end axis of the drive arm 4429 in the initial angle state is 4423 away from the axis of the first shaft body 4423. The angle between the plane formed by the end axis of the drive arm 4429 and the axis of the first shaft body 4423 in the initial angle state and the plane formed by the end axis of the drive arm 4429 and the axis of the first shaft 4423 in the final angle state is equal to the rotation angle of the rocker arm 4422 ±5°, that is, one limit point can be used to constrain two directions.

In this embodiment, the above-mentioned tilt mechanism has different reduction ratios at different tilt angles, which realizes the control accuracy requirements at different angles. The structure is compact and the centralized configuration reduces the space requirements. By using a multi-link connect rod, the reduction ratio can be changed with the change of the angle, which can increase the reduction ratio at a large load and reduce the reduction ratio at a small load, thereby reducing the peak driving moment and reducing the demand for drive. The tilt drive device of the present application is a rotary drive structure, which can amplify the driving force by the brake or reduction ratio adjustment device inside the tilt device; on one hand, it can overcome the moment borne by the execution end to achieve state maintenance at any position, maintain the current state position when the drive fails, and continue to work after the drive is restored; on the other hand, it can make the structural parts configuration more centralized.

Figure 20:
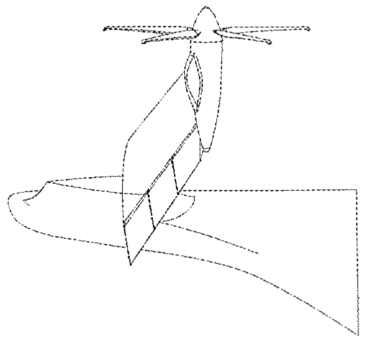
FIG. 20 is a partial view of a tilting-nacelle rotor on an empennage in a vertical take-off state, and a chord length of a control surface accounts for 100%.
Figure 21:
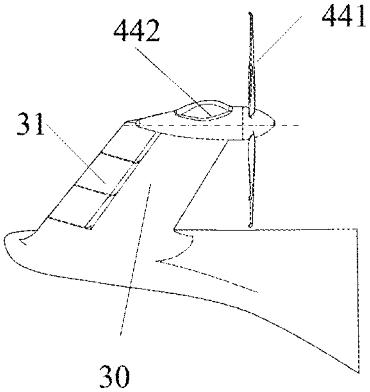
FIG. 21 is a partial view of a tilting-nacelle rotor on an empennage in a cruising state.
Figure 22:
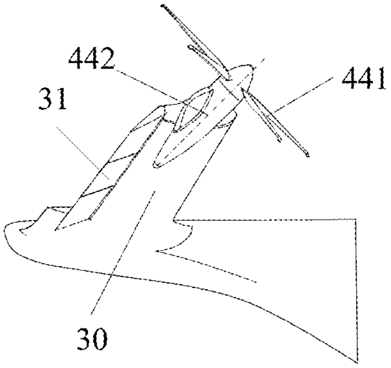
FIG. 22 is a partial view of a tilting-nacelle rotor on an empennage in an oblique climbing state.
Figure 23:
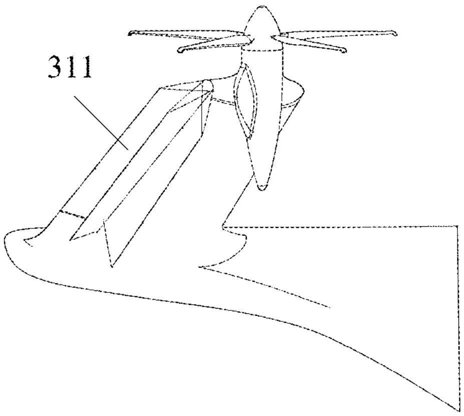
FIG. 23 is a rotation path diagram of ruddervators on an empennage.
Figure 24:
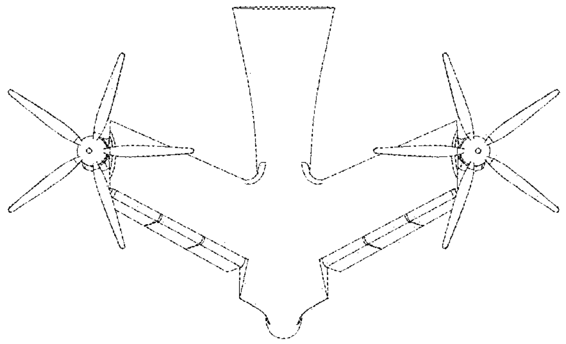
FIG. 24 is a top view of an empennage in a vertical take-off and landing state of an aircraft.

As shown in FIG. 1 to FIG. 7, and FIG. 20 to FIG. 23, in an embodiment of the direct take-off and landing aircraft of the present application, a roll axis X is taken as a reference, with the upward direction as a positive direction, and a rotation axis of the tilting rotor is configured to tilt within a range of −20° to 110°. Referring to FIG. 21, 0° is the rotation axis of the tilting rotor extending forward along the roll axis X direction. Referring to FIG. 23, 90° is the rotation axis of the tilting rotor upward along the vertical direction. Referring to FIG. 22, which shows a tilt state where the rotation axis of the tilting rotor is between 0° and 90°. It should be noted that when the tilt angle ranges from 900 to 110°, the vertical take-off and landing aircraft can fly backwards with the nose facing forward, which greatly expands the flight envelope and capability of the vertical take-off and landing aircraft, and reduces the risk of the vertical take-off and landing aircraft turning around in the air. When the vertical take-off and landing aircraft needs to take off, the tilt angle of all the inner tilting rotors can be set to any angle of 0 to 90°, such as 0°, 30°, 45°, 60° or 90°, according to flight control requirements.

The number of tilting rotors on the empennage 30 can be any even number less than 2N. Referring to FIG. 5 to FIG. 9, in this embodiment, the vertical take-off and landing aircraft includes four tilting rotors and four fixed rotors, the four fixed rotors are symmetrically provided at both sides of the fuselage 10, the four tilting rotors are provided at the inner side of the four fixed rotors in the span direction, two of the tilting rotors are provided on the empennage 30, and the two tilting rotors provided on the empennage are tilting-nacelle rotors, and two of the tilting rotors are installed on the fuselage 10 at the front side of the wing 20 or the wing 20. Specifically, the four tilting rotors are divided into two groups of equal number, respectively marked as a first group of tilting rotors and a second group of tilting rotors. The first group of tilting rotors are installed on a fuselage 10 or a wing 20 in front of the center of gravity G of the vertical take-off and landing aircraft, and the second group of tilting rotors are installed on an empennage 30 in the rear of the center of gravity G of the vertical take-off and landing aircraft. The first group of tilting rotors include a first tilting rotor 41 and a second tilting rotor 42, and the second group of tilting rotors include a third tilting rotor 43 and a fourth tilting rotor 44. The first tilting rotor 41 is installed on the third wing boom 411, and the second tilting rotor 42 is installed on the fourth wing boom 421 and is symmetrical with the first tilting rotor 41 about the symmetry plane 60 of the fuselage 10. The third tilting rotor 43 is installed on the empennage 30 by the first power pod 442, and the fourth tilting rotor 44 is installed on the empennage 30 by the second power pod 442. The first power pod 442 and the second power pod 442 are symmetrically arranged about the symmetry plane 60 of the fuselage 10, and the fourth tilting rotor 44 and the third tilting rotor 43 are symmetrically arranged about the symmetry plane 60 of the fuselage 10.

In the vertical take-off and landing state, the rotation axes of the four tilting rotors are all tilted upward in the vertical direction, and the first tilting rotor 41, the second tilting rotor 42, the third tilting rotor 43 and the fourth tilting rotor 44 are all distributed on the first circumference centered on point B. The projection of the first tilting rotor 41 on the horizontal plane and the projection of the fourth tilting rotor 44 on the horizontal plane are centrally symmetrical about point B, and the projection of the second tilting rotor 42 on the horizontal plane and the projection of the third tilting rotor 43 on the horizontal plane are centrally symmetrical about point B.

Referring to FIG. 7, the four fixed rotors are divided into two groups of equal number, marked as the first group of fixed rotors and the second group of fixed rotors respectively. The first group of fixed rotors is installed on the wing 20 in front of the center of gravity of the vertical take-off and landing aircraft, and the second group of fixed rotors is installed on the wing 20 behind the center of gravity of the vertical take-off and landing aircraft. The first group of fixed rotors include a first fixed rotor 51 and a second fixed rotor 52, and the second group of fixed rotors include a third fixed rotor 53 and a fourth fixed rotor 54. The first fixed rotor 51, the second fixed rotor 52, the third fixed rotor 53 and the fourth fixed rotor 54 are all distributed on a second circumference centered on point A. The first fixed rotor 51 and the second fixed rotor 52 are symmetrical about the symmetry plane 60 of the fuselage 10, the third fixed rotor 53 and the fourth fixed rotor 54 are also symmetrical about the symmetry plane 60 of the fuselage 10, the rotating shafts of the four fixed rotors all extend upward. The projection of the first fixed rotor 51 on the horizontal plane and the projection of the fourth fixed rotor 54 on the horizontal plane are centrally symmetrical about point A, and the projection of the second fixed rotor 52 on the horizontal plane and the projection of the third fixed rotor 53 on the horizontal plane are centrally symmetrical about point A. It should be noted that in the present application, the front side refers to the extension direction toward the nose, and the rear side refers to the extension direction toward the side of the empennage 30.

In an embodiment of the vertical take-off and landing aircraft of the present application, the spacing of the four fixed rotors along the extension direction of the fuselage, that is, the spacing from the second fixed rotor 52 to the fourth fixed rotor 54, or the spacing from the first fixed rotor 51 to the third fixed rotor 53 is L3; the spacing of the four tilting rotors along the extension direction of the fuselage, that is, the spacing from the second tilting rotor 42 to the fourth tilting rotor 44, or the spacing from the first tilting rotor 41 to the third tilting rotor 43 is L4, then $0.1\ (L3+L4) \geq 4L1+2L2 \geq 0.01\ (L3+L4)$. This setting method can make the center of gravity point G closer to the front side relative to point A and point B during the tilt stage and the cruise stage, and point B is always located at the side of point A close to the empennage 30, which has a relatively large longitudinal and heading static stability margin. The aircraft is more capable of resisting extreme windy weather and is safer to fly.

Referring to FIG. 7, a first wing boom 511 is installed on the wing 20 on one side of the fuselage 10, and a second wing boom 521 is installed on the wing 20 on the other side of the fuselage 10; the first wing boom 511 and the second wing boom 521 are symmetrically arranged about the symmetry plane 60 of the fuselage 10, and the 2M fixed rotors are symmetrically installed on the first wing boom 511 and the second wing boom 521 on both sides of the fuselage 10, and are respectively located at the front and rear sides of the wing 20 and the front and rear ends of the first wing boom 511 and the second wing boom 521. At the same time, the projections of all the fixed rotors on the horizontal plane are roughly centrally symmetrical about point A.

Referring to FIG. 1 to FIG. 4, in an embodiment, unlike the vertical take-off and landing aircraft in FIG. 5 to FIG. 9, the vertical take-off and landing aircraft in this embodiment only includes four tilting rotors, but does not have a fixed rotor. The four tilting rotors are symmetrically installed at both sides of the fuselage 10, and two of the tilting rotors are symmetrically installed on the wing 20 about the fuselage 10. The structure of the four tilting rotors and the installation relationship corresponding to the fuselage are the same as those in FIG. 5 to FIG. 9 and FIG. 34. The specific position is adaptively adjusted according to the aircraft, which will not be repeated here.

Different from the vertical take-off and landing aircraft in FIG. 1 to FIG. 4, in another embodiment of the vertical take-off and landing aircraft of the present application, the vertical take-off and landing aircraft includes six tilting rotors but does not include a fixed rotor, and the six tilting rotors are symmetrically installed on both sides of the fuselage 10, four of the tilting rotors are symmetrically installed on the wing 20 about the fuselage 10, and the other two tilting rotors are symmetrically installed on the empennage 30. The empennage 30 is a V-shaped tail, and the two tilting rotors located on the empennage 30 are tilting-nacelle rotors, and two tilting-nacelle rotors are respectively installed on the two upper tips of the V-shaped tail; the two tilting rotors are respectively arranged on the wing tips of the wing 20 on both sides of the fuselage 10, and are symmetrical about the symmetry plane 60 of the fuselage 10; the tilting rotors located on the wing tips of the wing 20 are preferably tilting-nacelle rotors, and the last two remaining tilting rotors are installed at the front side of the wing 20 by wing booms and are tilting-propeller rotors. However, it should be noted that, if conditions permit, the tilting rotor installed at the front side of the wing 20 by the wing boom can also be a tilting-nacelle rotor.

In the present application, the installation position and structure of the ruddervators 31 can be various, for example, it can be set at any suitable position on the empennage 30, or it can be any existing suitable structure of the ruddervators 31. Specifically, referring to FIG. 5 and FIG. 17, the ruddervators 31 includes a control surface 311 and a drive device (not shown), the control surface 311 is rotatably connected to the empennage 30 or a tail of the fuselage 10, and the drive device is configured to drive the control surface 311 to rotate so as to adjust a heading of the vertical take-off and landing aircraft. The drive device of the ruddervators 31 includes but is not limited to a motor, or a combination of a motor and a reducer.

Figure 19:
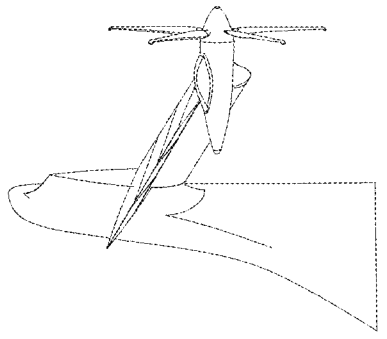
FIG. 19 is a partial view of a tilting-nacelle rotor on an empennage in a vertical take-off state, and a chord length of a control surface accounts for 60%.
Figure 25:
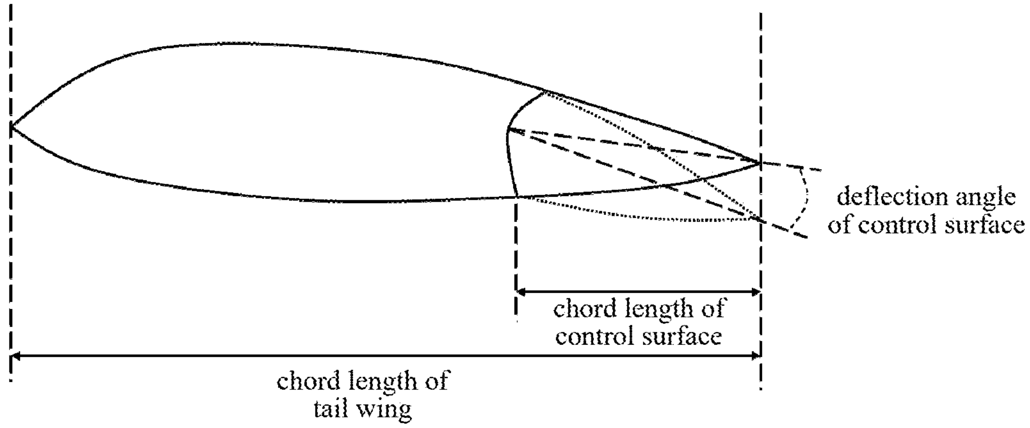
FIG. 25 is a schematic diagram of a chord length ratio of a control surface of an empennage, and a schematic diagram of a deflection angle of a control surface.

Referring to FIG. 25, in some embodiments, the ratio of the chord length of the control surface 311 to the chord length of the empennage 30 is 15% to 100%, for example, it can be any value between 15% and 100%, such as 15%, 30%, 45%, 60%, 90%, 100%, etc. As an example, as shown in FIG. 18, the chord length of the control surface 311 accounts for 30% of the chord length of the empennage 30; as shown in FIG. 19, the chord length of the control surface 311 accounts for 60% of the chord length of the empennage 30; as shown in FIG. 20, the chord length of the control surface 311 accounts for 100% of the chord length of the empennage 30, but it is not limited to the ratios in FIG. 18 to FIG. 20. It should be noted that, referring to FIG. 25, the chord length is the distance from the leading edge point to the trailing edge point of the cross section of the empennage 30 airfoil, and the chord length ratio is the ratio of the length of the control surface on the empennage 30 in the heading direction to the length of the empennage 30 (not the length ratio along the span direction Y) from the top view.

Referring to FIG. 18, in an embodiment of the vertical take-off and landing aircraft of the present application, with the roll axis X as the reference and the upward direction as the positive direction, the deflection angle of the control surface 311 is −90° to 30°. For example, as shown in FIG. 23, the deflection angle of the control surface 311 can be any angle between −90° to 30°, such as −90°, −60°, −30°, −15°, 0°, 150 and 30°.

Figure 9:
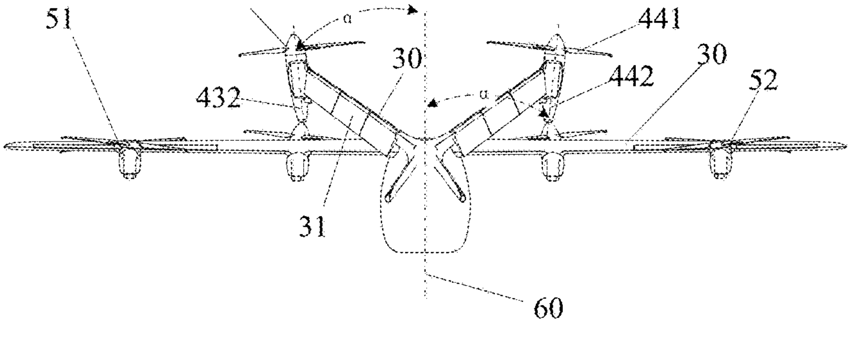
FIG. 9 is a rear view of a vertical take-off and landing aircraft in a vertical take-off and landing state according to yet another embodiment of the present application.

The rotation axes of the 2N tilting rotors and the rotation axes of the 2M fixed rotors in the present application can also be arranged along the vertical direction in the vertical take-off and landing state. Referring to FIG. 9, in an embodiment of the vertical take-off and landing aircraft of the present application, the 2N tilting rotors are symmetrically arranged at both sides of the fuselage 10, and the angle α between the plane formed by the rotation axis of the rotor during the tilt process (that is, the plane formed by the rotation axis of the rotor rotating around the tilt axis) and the symmetry plane 60 of the fuselage 10 is −15° to +15°, for example, it can be any angle between −15° to +15°, such as −15°, −10°, 0°, 10°, 15°, etc.; the angle is positive from bottom to top toward the outside of the span direction, and negative from bottom to top toward the symmetry plane 60. The angle between the rotation axis of the 2M fixed rotors and the symmetry plane of the fuselage is −15° to +15°, for example, it can be any angle between −15° to +15°, such as −15°, −10°, 0°, 10°, 15°, etc., and the angle is positive from bottom to top toward the outside of the span direction, and negative from bottom to top toward the symmetry plane 60.

In the present application, the empennage 30 can be any one of a V-shaped empennage, a Y-shaped empennage, an H-shaped empennage, an X-shaped empennage, a T-shaped empennage, an H-shaped empennage or a U-shaped empennage, and the tilting rotor on the empennage 30 is installed at the upper side of the empennage 30, and tilts upward in the vertical take-off and landing state. This reduces the possibility of the rotor causing harm to the passengers when the passengers enter and exit the aircraft. Referring to FIG. 1 to FIG. 4, in this embodiment, the empennage 30 is a V-shaped tail, two tilting rotors are installed on the empennage 30, and the two tilting rotors are respectively installed on the two upper tips of the empennage 30. In other embodiments, the empennage 30 can also be any of the above shapes.

It should be noted that, in the present embodiment, when the vertical take-off and landing aircraft is flying forward in a cruising state, the rotation axis of the tilting rotor on the empennage 30 and the rotation axis of the tilting rotor at other positions may extend along the roll axis X; but in other embodiments, the rotation axis of the tilting rotor on the empennage 30 and the rotation axis of the tilting rotor at other positions may not extend along the roll axis X, and may be within the vertical plane where the roll axis X is located, and within the range of ±20° with the roll axis X as a reference. Moreover, in the present application, the tilting rotors projected at different roll axis X coordinate positions along the roll axis X direction, their power pods 442 can also be controlled independently of each other, and the tilt can also be independently controlled and not related to each other. In this mode, the tilt angles of the front tilting rotor and the tilting rotor on the empennage 30 can be inconsistent, and the tilt process can be asynchronous. For example, with the roll axis X as 0°, with the angle above the roll axis X is positive and the angle below the roll axis X is negative, the tilt angle of the power pod 442 of the tilting rotor on the front fuselage 10 or the wing 20 can be 10°, and the tilt angle of the power pod 442 of the tilting rotor on the rear fuselage 10 or the wing 20 can be −10°.

It should be noted that when the vertical take-off and landing aircraft of the present application is in the vertical take-off and landing state, the rotation axis of the tilting rotor on the empennage 30 and the rotation axis of the tilting rotor at other positions may extend upward along the vertical direction, or may not extend upward along the vertical direction. That is, the tilt angle of the front tilting rotor and the tilt angle of the tilting rotor on the empennage 30 are not limited to a tilt angle of 90°. To enhance the control capability, the tilt angle of the rotation axis of the front tilting rotor and the tilt angle of the rotation axis of the tilting rotor on the empennage 30 may be any value between 70° and 110°, such as 70°, 80°, 90°, 100°, and 110°. The rotation control and tilt control of each of the 2N tilting rotors are relatively independent, and the tilt angles of the 2N tilting rotors can be completely consistent, or can be different between any two, or can be partially consistent. For example, the tilt angles of the multiple tilting rotors on the fuselage 10 or the wing 20 located on the front side of the empennage 30 of the 2N tilting rotors can be consistent, marked as the first tilt angle; the tilt angles of the tilting rotors on the rear side of the empennage 30 can be consistent, marked as the second tilt angle; the first tilt angle is not equal to the second tilt angle, for example, the first tilt angle can be 100°, and the second tilt angle can be 80°. In this way, different pitch trim moments can be obtained at different positions. It should be noted that the tilt angle is an angle between a rotation axis of the tilting rotor and a roll axis X, with the center point of the tilt axis of the tilting rotor as the vertex.

Since the rear tilting rotor among the 2N tilting rotors is arranged on the empennage 30, in order to take into account that the center of the 2N tilting rotors is located at the preset position, the tilting rotor on the empennage 30 needs to be arranged forward, but considering that the lengthening of the pod of the tilting rotor will lead to a decrease in the overall rigidity of the vertical take-off and landing aircraft, thereby reducing safety, thus, in an embodiment of the present application, the empennage 30 is set to a forward-swept type, and the tilting rotor provided on the forward-swept empennage is a tilting-nacelle rotor. The forward sweep angle of the empennage 30 is not limited, in order to achieve a configuration that can balance the 2N tilting rotors without affecting the overall rigidity of the vertical take-off and landing aircraft.

The forward sweep of the empennage 30 will shorten the moment arm of the empennage 30 in the fixed-wing flight mode, greatly reduce the capacity of the horizontal tail (horizontal projection of the empennage 30) and the capacity of the vertical tail (vertical projection of the empennage 30), and the side projection area of the fuselage 10 in front of the aerodynamic focus is larger than the side projection area of the fuselage 10 behind the aerodynamic focus, therefore, the effective area of the vertical tail will be further reduced. However, blindly increasing the area of the empennage 30 will make the overall configuration of the aircraft out of control, and finally cause the vertical tail capacity to be insufficient, so that when the aircraft is flying in fixed-wing mode, the lateral stability is insufficient, and the heading is even in a statically unstable state, and the dynamic stability modal flight quality in the lateral direction is low, which poses a high difficulty to the flight control. In order to solve the above problems, referring to FIG. 9, a tail fin is provided below the forward-swept empennage 30 and the tail fin is connected to the tail of the fuselage 10. The structure and number of the tail fin may not be limited. The structure of the tail fin may refer to any existing suitable tail fin structure. It may include one tail fin body or multiple tail fin bodies, as long as the empennage 30 and the tail fin have sufficient vertical tail capacity to stabilize the lateral heading of the vertical take-off and landing aircraft when flying in the fixed-wing mode.

Referring to FIG. 7 and FIG. 28 to FIG. 32, the present application provides a control method for a vertical take-off and landing aircraft, and the vertical take-off and landing aircraft includes: a fuselage and 2N tilting rotors. The fuselage 10 is a symmetrical structure and has a symmetry plane 60 extending along the length direction of the fuselage 10. Both sides of the fuselage 10 are provided with a wing 20 symmetrically, and the wings 20 on both sides are symmetrical about the symmetry plane 60 of the fuselage 10. an empennage 30 is arranged at the tail of the fuselage 10, and ruddervators 31 is arranged on the empennage 30. 2N tilting rotors are installed on both sides of the fuselage 10, N is a natural number greater than or equal to 2, the 2N tilting rotors are symmetrically arranged about the symmetry plane 60 of the fuselage 10, and a part of the tilting-propeller rotors in 2N tilting rotors are installed on the empennage 30. In the vertical take-off and landing state, the projections of the propellers of the 2N tilting rotors on the horizontal plane are centrally symmetric about point B, point B and the center of gravity point G of the vertical take-off and landing aircraft are both located in the symmetry plane of the fuselage, and point B is located at the side of point G close to the empennage. During the transition of the vertical take-off and landing aircraft from the vertical take-off and landing state to the cruising state, point G and point B both move along the symmetry plane toward the side close to the nose, and point B is always located at the side of point G close to the empennage.

In an embodiment of the vertical take-off and landing aircraft of the present application, the following method is used for pitch control:

During the flight, allocating a pitch control distribution among the ruddervators 31, the 2N tilting rotors and the 2M fixed rotors according to a current airspeed or a dynamic pressure; and controlling the ruddervators 31, the 2N tilting rotors and the 2M fixed rotors respectively according to the pitch control distribution to achieve pitch trim and maneuver.

In an embodiment of a vertical take-off and landing aircraft of the present application, according to the pitch control distribution, controlling 2N tilting rotors includes: a tilt angle differential adjustment process: that is, differentially adjusting the pitch moment to perform pitch trim and maneuver by the tilt angle difference between the tilting rotor on the empennage 30 and any one of the other tilting rotors at the front side of the empennage; and/or, a rotation speed differential adjustment process: that is, differentially adjusting the pitch moment to perform pitch trim and maneuver by the rotation speed difference between the tilting rotor on the empennage 30 and any one of the other tilting rotors at the front side of the empennage; and/or, a tilt speed differential adjustment process: that is, differentially adjusting the pitch moment to perform pitch trim and maneuver by the tilt speed difference between the tilting rotor on the empennage and any one of the other tilting rotors at the front side of the empennage. It should be noted that the above-mentioned tilt angle differential adjustment process, rotation speed differential adjustment process, and tilt speed differential adjustment process can be implemented individually, in combination with each other, or in combination with all three at the same time.

Figure 28:
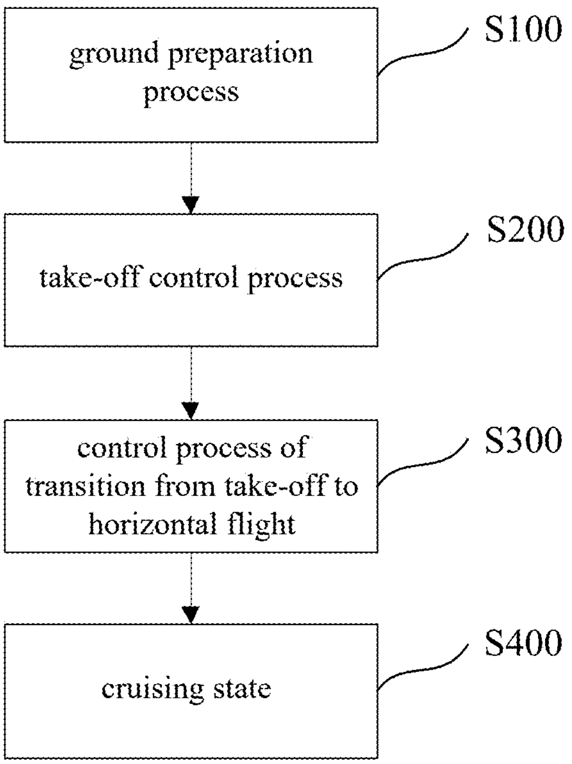
FIG. 28 is a flow chart of a vertical take-off and landing aircraft from a ground state to a cruising state according to an embodiment of the present application.

Referring to FIG. 28, the flight process includes four stages in sequence, including: S100, ground preparation process, S200, take-off control process, S300, control process of transition from take-off to horizontal flight, and S400, cruising state.

S100, ground preparation process. The ground preparation process first needs to starting up the vertical take-off and landing aircraft, perform system power-on detection, and then confirm full stroke status of a servo system such as the tilt mechanism and the ruddervators 31.

S200, take-off control process. The take-off control process is the process of the vertical take-off and landing aircraft climbing from the ground to the set altitude. In this process, the tilting rotor and the fixed rotor mostly keep the tilt angle and rotation speed unchanged. Compared with the process of transitioning the horizontal flight, this process is relatively stable.

S300, control process of transition from take-off to horizontal flight. The control process of transition from take-off to horizontal flight often involves changes in the tilt angle of the tilting rotor, and/or the rotation speed of the tilting rotor, and/or the rotation speed of the fixed rotor. Therefore, the pitch impact force in this process is relatively large, and the control of the vertical take-off and landing aircraft is relatively difficult.

S400, cruising state. In the cruising state, the vertical take-off and landing aircraft performs horizontal flight, and the aircraft sails in the horizontal direction, which is relatively stable.

Figure 32:
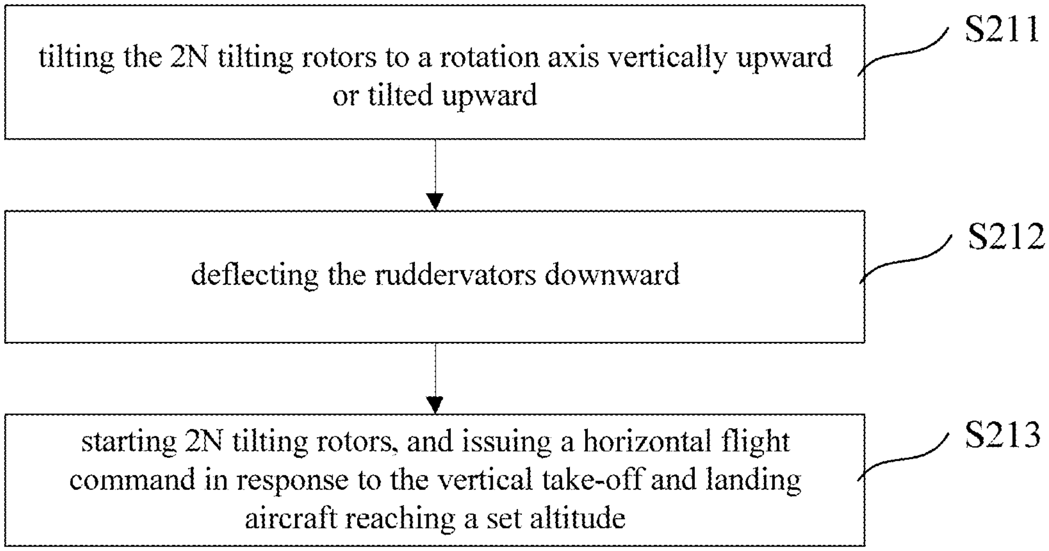
FIG. 32 is a flow chart of a take-off control process of a vertical take-off and landing aircraft according to an embodiment of the present application.

Referring to FIG. 32, in an embodiment, the take-off control process of step S200 includes the following steps.

S211, tilting the 2N tilting rotors to a rotation axis vertically upward to the vertical take-off and landing position or tilt position (for example, between 0° and 90°) to provide power for climbing. The vertical take-off and landing position can be a position where the rotation axis of the tilting rotor and the roll axis form an angle of 90°; the tilt position can be a position between 0° and 90° (excluding the end value) between the rotation axis of the tilting rotor and the roll axis.

S212, deflecting the ruddervators 31 downward to cause the ruddervators 31 participate in the take-off control.

S213, starting 2N tilting rotors, and issuing a horizontal flight command in response to the vertical take-off and landing aircraft reaching a set altitude.

In the take-off process from S211 to S213, if the tilting rotor is set at 90°, the vertical take-off and landing aircraft will take off vertically normally, and the throttles of the 2N tilting rotors can be consistent. At this time, the tilting rotor on the empennage 30 has the largest shielding area in the vertical take-off stage and the transition stage, which will cause a relatively large nose-up moment. If the rotation axis of all tilting rotors is placed in a tilted position between 0° and 90°, when the aircraft takes off, the inner tilting rotor starts the throttle. Since the inner rotor provides a forward pull component, the aircraft climbs upward at an angle. As the flight speed gradually increases, the tilt angle of the inner tilting rotor gradually decreases until it tilts to 0° and switches to horizontal flight fixed-wing mode. In this solution, the nose-up moment caused by the empennage 30 shielding the tilting rotor is moderate, the control difficulty is relatively small, and the maximum thrust margin requirement of the propulsion system is relatively small.

Figure 29:
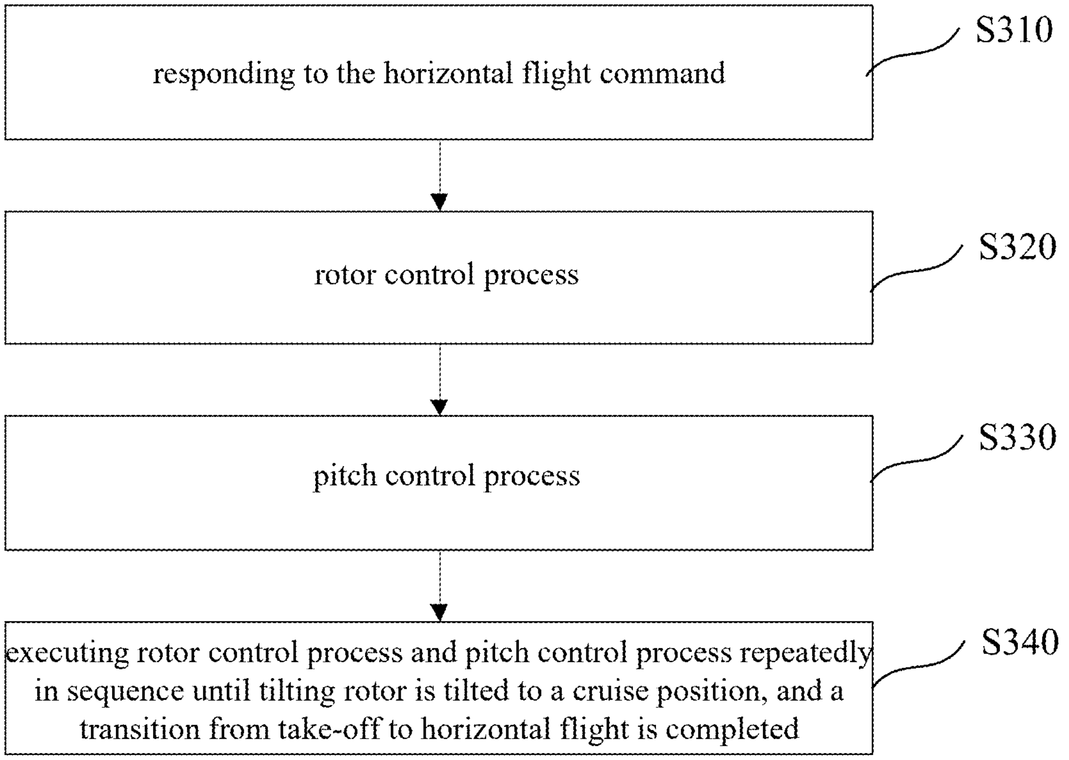
FIG. 29 is a flow chart of a transition from take-off to horizontal flight of a vertical take-off and landing aircraft according to an embodiment of the present application.
Figure 30:
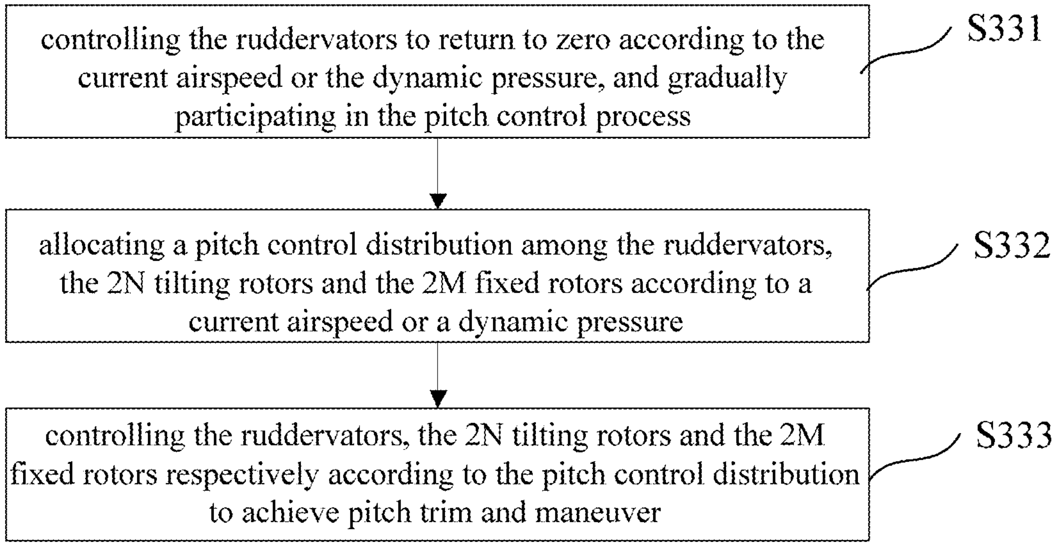
FIG. 30 is a flow chart of a pitch control of a vertical take-off and landing aircraft according to an embodiment of the present application.

As an optimization, referring to FIG. 29, in this embodiment, the control process of transition from take-off to horizontal flight in S300 includes the following processes.

S310, responding to the horizontal flight command. The horizontal flight command can be issued by the pilot, or can be automatically issued by the vertical take-off and landing aircraft when it determines that the preset flight conditions are met.

S320, rotor control process. This process is greatly affected by the take-off control process of S200, and will be greatly different depending on the state of the tilting rotor.

S330, pitch control process. Considering that during the process of transition from take-off to horizontal flight, the tilting rotor is tilted multiple times to the set cruise position in which the rotation axis of the tilting rotor is parallel to the roll axis, and the vertical take-off and landing aircraft will be subject to a certain pitch impact force during each tilt process, the pitch control process of S330 can be performed after each S320 rotor control process of the transition from take-off to horizontal flight.

S340, executing the rotor control process and the pitch control process repeatedly in sequence until the tilting rotor is tilted to a cruise position, and a transition from a take-off to a horizontal flight is completed. The cruise position can be, for example, a position where the rotation axis of the tilting rotor is parallel to the roll axis when the tilt angle is 0°.

Figure 31:
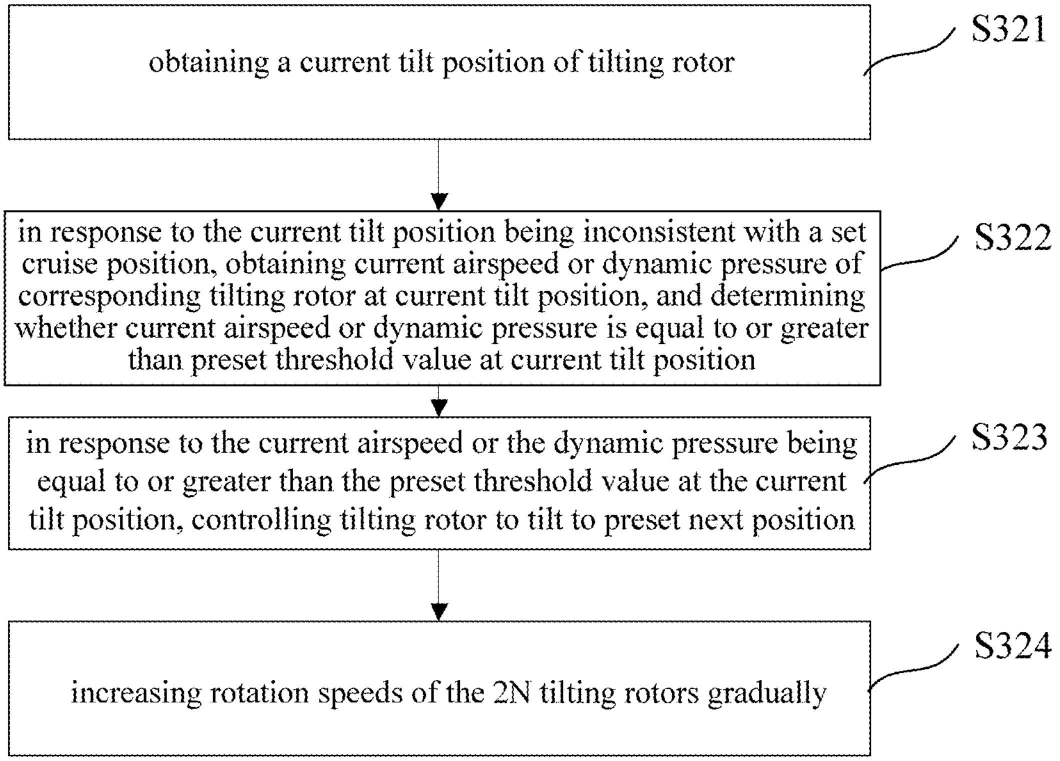
FIG. 31 is a flow chart of a rotor control of a vertical take-off and landing aircraft according to an embodiment of the present application.

Referring to FIG. 31, in an embodiment, the rotor control process in step S320 includes the following steps:

S321, obtaining a current tilt position of each tilting rotor. In this process, an angle sensor can be set on the tilting rotor to feed back the current tilt position to the central control system, or the corresponding current tilt position can be directly fed back to the central control system by the tilt drive device corresponding to the tilting rotor.

S322, in response to the current tilt position being inconsistent with a set cruise position, obtaining a current airspeed or a dynamic pressure of a corresponding tilting rotor at the current tilt position, and determining whether the current airspeed or the dynamic pressure is equal to or greater than a preset threshold value at the current tilt position. It should be noted that the set cruise position is the position of the preset vertical take-off and landing aircraft in the horizontal flight state, for example, it can be the 0° position where the rotation axis of the tilting rotor is parallel to the roll axis X, it also can be other positions between 0°±5°.

S323, in response to the current airspeed or the dynamic pressure being equal to or greater than the preset threshold value at the current tilt position, controlling the tilting rotor to tilt to a preset next position.

Figure 1:
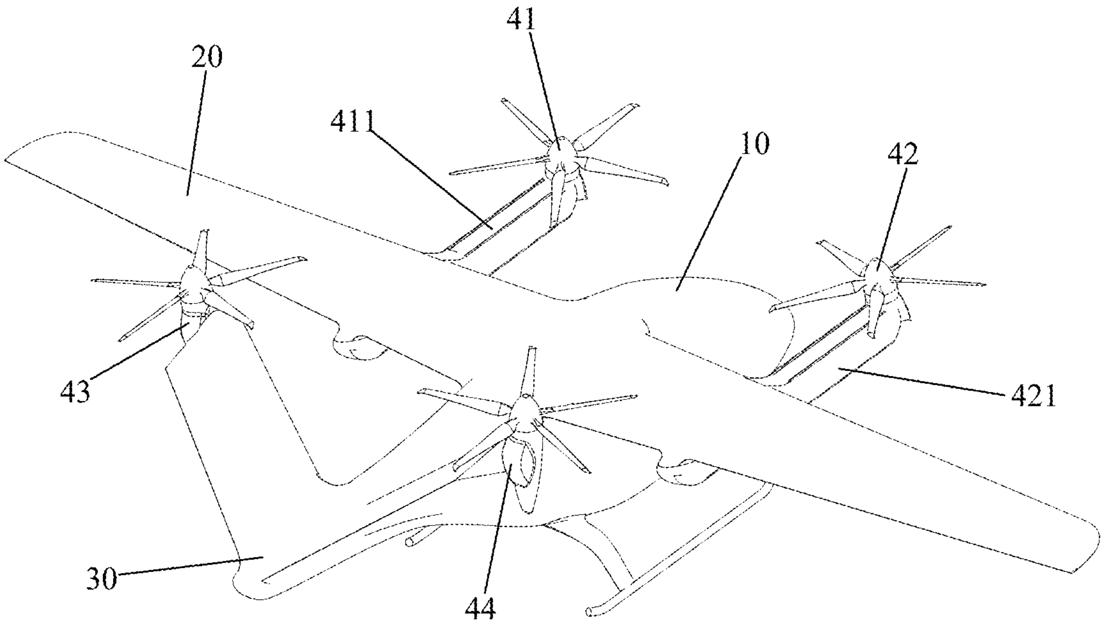
FIG. 1 is an isometric view of a vertical take-off and landing aircraft in a vertical take-off and landing state according to an embodiment of the present application.
Figure 2:
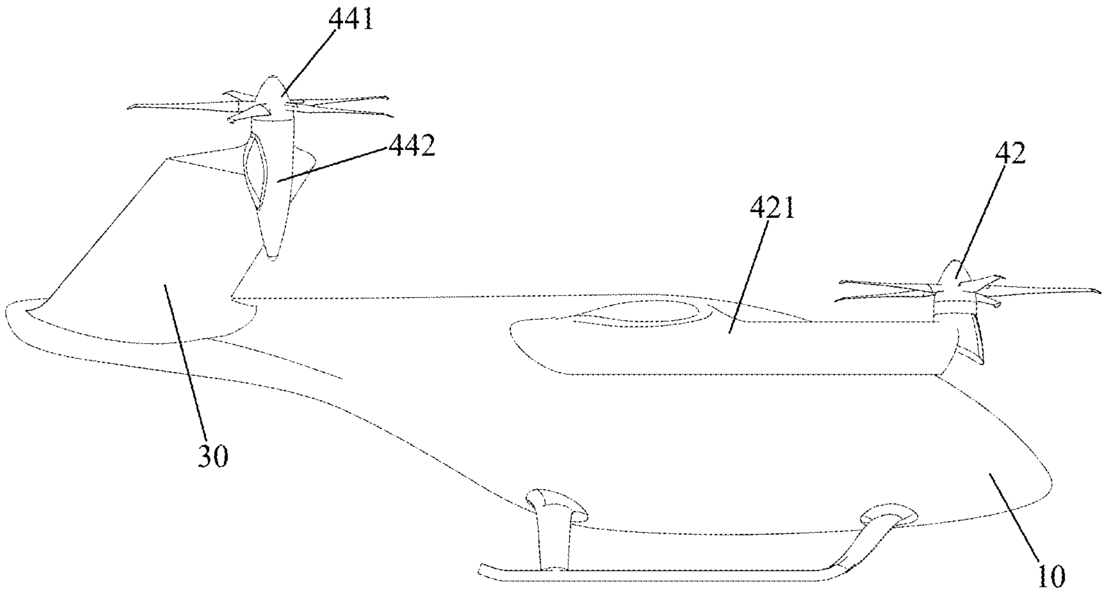
FIG. 2 is a side view of a vertical take-off and landing aircraft in a vertical take-off and landing state according to an embodiment of the present application.
Figure 3:
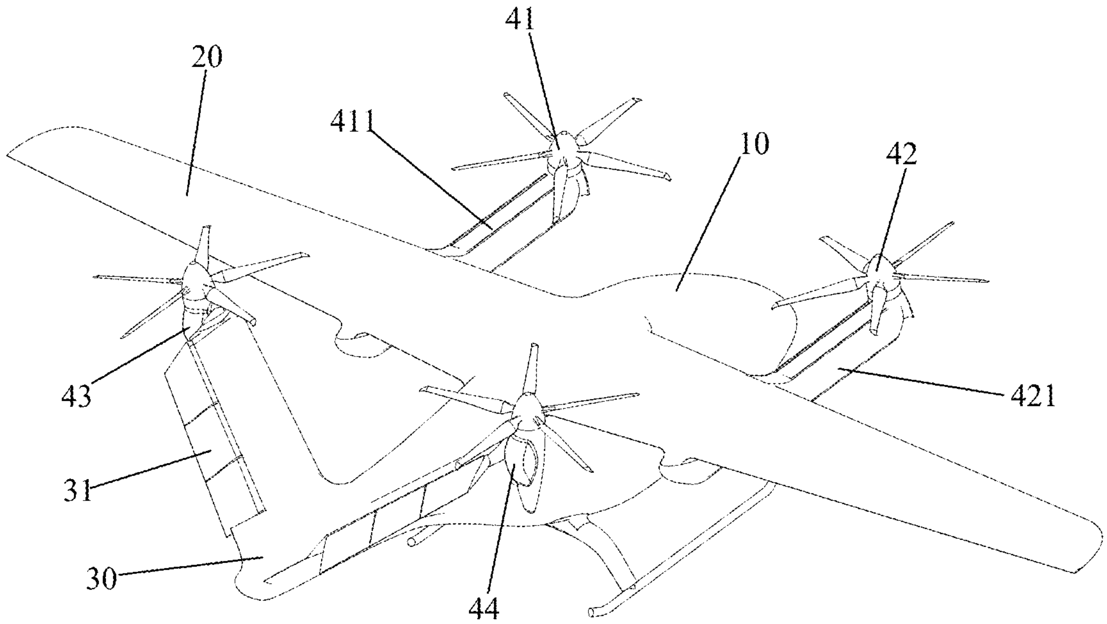
FIG. 3 is an isometric view of a vertical take-off and landing aircraft in a vertical take-off and landing state according to another embodiment of the present application.
Figure 4:
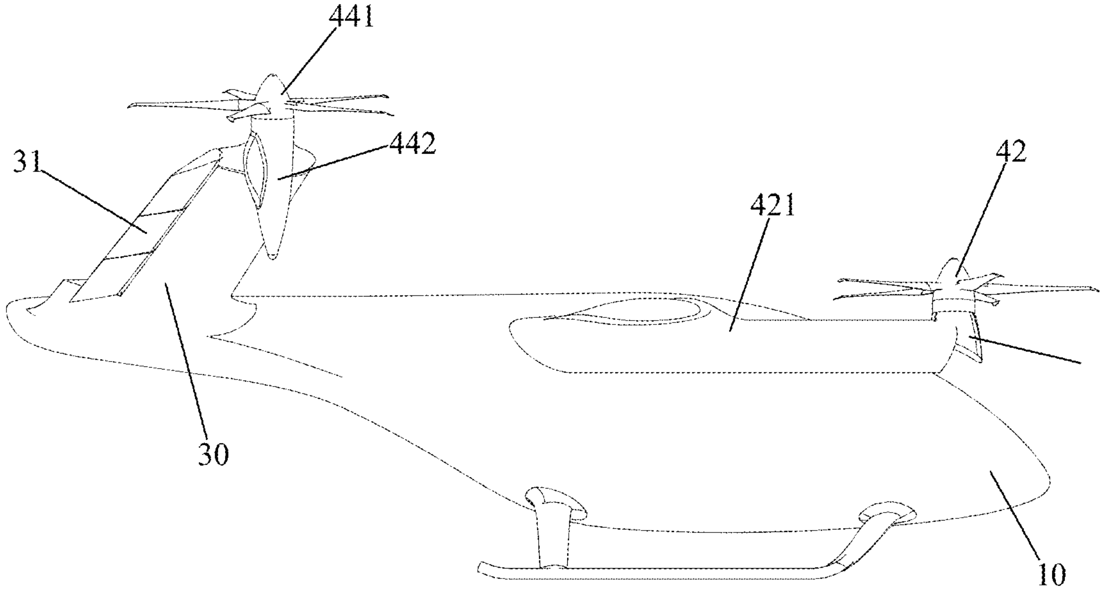
FIG. 4 is a side view of a vertical take-off and landing aircraft in a vertical take-off and landing state according to another embodiment of the present application.
Figure 5:
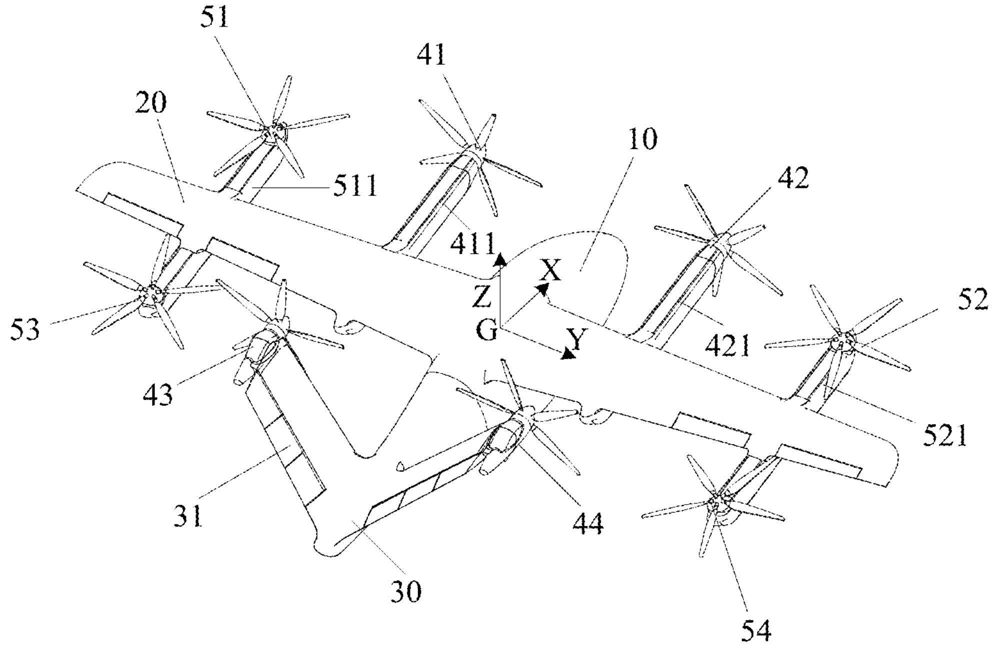
FIG. 5 is an isometric view of a vertical take-off and landing aircraft in a cruising state according to yet another embodiment of the present application.
Figure 6:
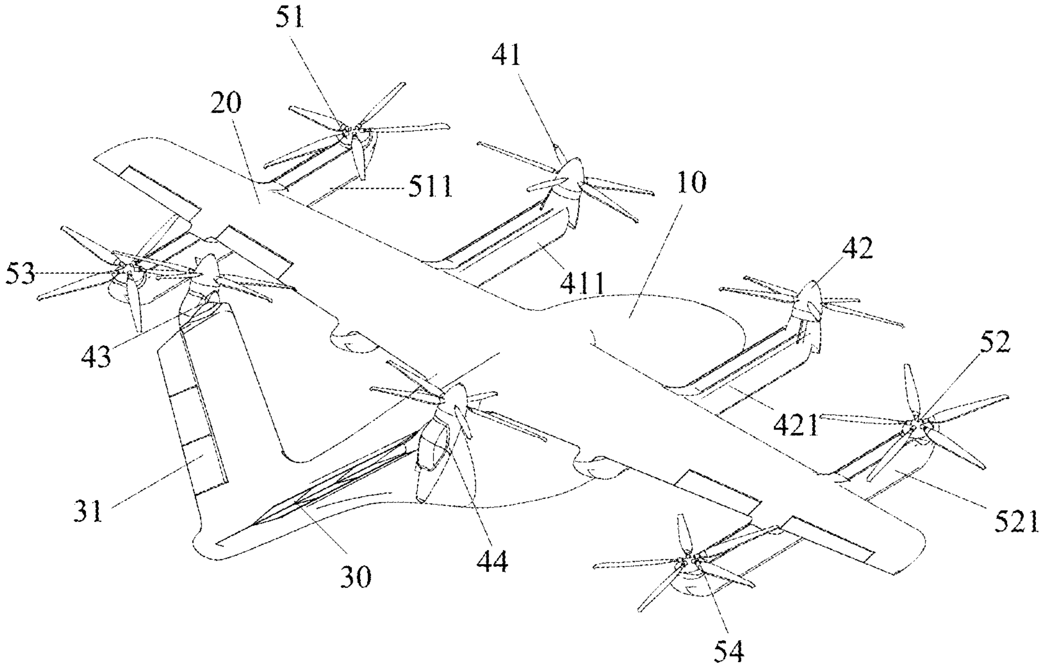
FIG. 6 is an isometric view of a vertical take-off and landing aircraft in a vertical take-off and landing state according to yet another embodiment of the present application.

S324, increasing rotation speeds of the 2N tilting rotors gradually. As shown in FIG. 1, if the vertical take-off and landing aircraft does not have 2M fixed rotors, the forward power can be obtained by gradually increasing the rotation speed of the 2N tilting rotors. However, if, as shown in FIG. 7, the vertical take-off and landing aircraft has 2N tilting rotors and 2M fixed rotors, in order to achieve horizontal flight, while gradually increasing the rotation speed of the 2N tilting rotors, it is also necessary to gradually reduce the rotation speed of the 2M fixed rotors to the set rotation speed.

Figure 33:
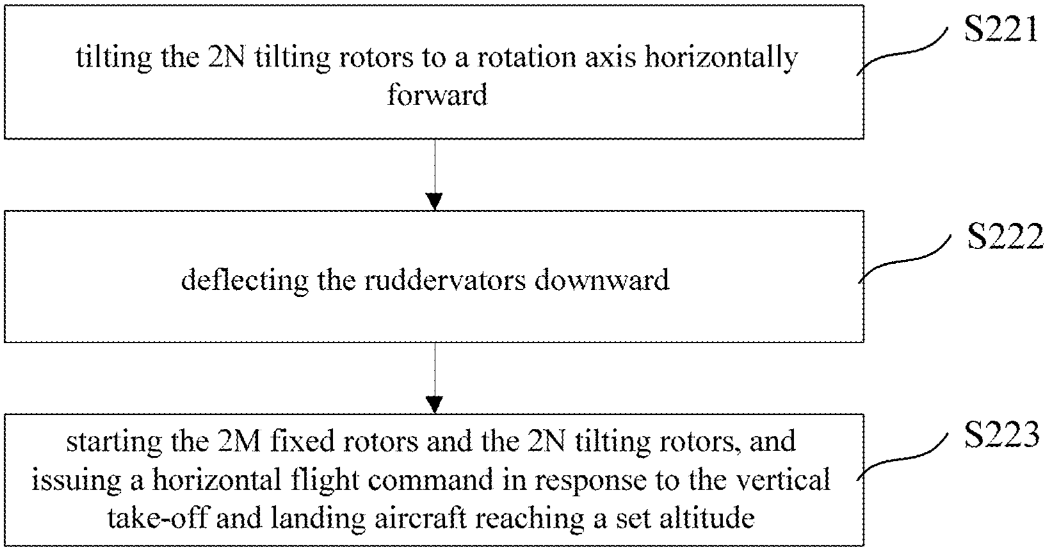
FIG. 33 is a flow chart of a take-off control process of a vertical take-off and landing aircraft according to an embodiment of the present application.
Figure 34:
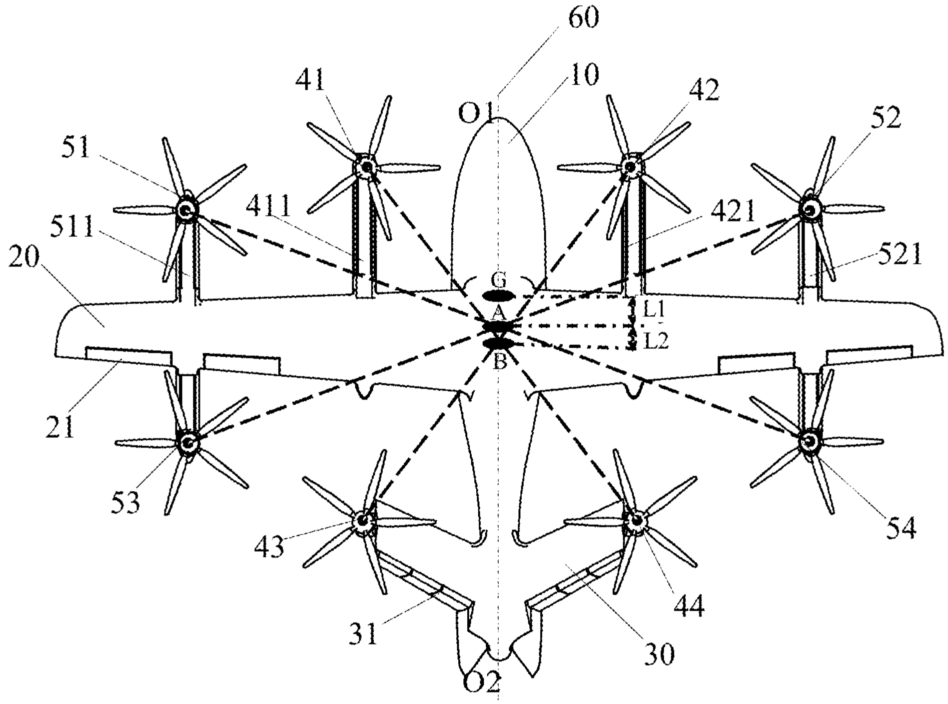
FIG. 34 is a top view of a vertical take-off and landing aircraft in a vertical take-off and landing state according to another embodiment of the present application.

Referring to FIG. 7, in another embodiment, the vertical take-off and landing aircraft includes 2M fixed rotors, with M is a natural number greater than or equal to 2. M can be the same as N or different from N. 2M fixed rotors are symmetrically provided at the wings on both sides of the fuselage and provided at the outer side of the tilting rotors. In the vertical take-off and landing state, the projections of all the fixed rotors on the horizontal plane are centrally symmetrical about point A; point A is located in the symmetry plane of the fuselage, and coincides with point G or is located on the side of point G close to the empennage. In the process of the vertical take-off and landing aircraft transitioning from the vertical take-off and landing state to the cruising state, point G and point B move along the symmetry plane toward the side close to the nose, point G is located at the side of point A close to the nose or coincides with point A, and point B is always located on the side of point A close to the empennage. Referring to FIG. 33, in an embodiment, the take-off process of the vertical take-off and landing aircraft in S200 is different from the process from S211 to S213 in FIG. 32. The take-off process in S200 includes:

S221, tilting the 2N tilting rotors to a rotation axis horizontally forward and parallel to the roll axis X.

S222, deflecting the ruddervators 31 downward.

S223, starting the 2M fixed rotors and the 2N tilting rotors, and issuing a horizontal flight command in response to the vertical take-off and landing aircraft reaching a set altitude.

In the takeoff process from S221 to S223, the rotation axis of all tilting rotors is set to 0° (as shown in FIG. 7), and the aircraft changes to the composite wing mode. The aircraft takes off vertically from the outer multiple rotors. The output of the outer multiple rotors are twice that of control scheme 1. The inner tilting rotors are gradually started in the transition stage from vertical to horizontal flight, and the throttle is gradually increased until the transition to horizontal flight is successful. In this scheme, the empennage 30 of inner tilting rotor has the smallest shielding area, the nose-up moment generated is the smallest, and the control is the simplest, and it is basically the control mode of the composite wing; but the required propulsion system tension margin is relatively large, and the requirements for the propulsion system are relatively high. This control mode is reduced in non-emergency situations.

Those skilled in the art can understand that, since the axis of the tilting rotor is always parallel to the roll axis X during the takeoff process from S221 to S223, in the S320 rotor control process in the S300 control process of transition from take-off to horizontal flight, there are no longer any related processes from S321 to S323. It is only necessary to gradually increase the speed of the 2N tilting rotors and gradually reduce the speed of the 2M fixed rotors to the set speed.

It should be noted that, regardless of whether the rotor control process in S300 has the tilt control process from S321 to S324, the vertical take-off and landing aircraft will be subjected to a relatively high pitch impact force during the process of transitioning from take-off to horizontal flight. Based on this, referring to FIG. 30, in an embodiment of the present application, the pitch control process of step S330 includes:

S332, allocating a pitch control distribution among the ruddervators 31, the 2N tilting rotors and the 2M fixed rotors according to a current airspeed or a dynamic pressure. In this process, according to the current speed of the vertical take-off and landing aircraft, distributing the pitch adjustment force to the ruddervators 31, 2N tilting rotors and 2M fixed rotors according to the set distribution rules, so as to achieve a relatively balanced pitch control by the pitch control distribution.

S333, controlling the ruddervators, the 2N tilting rotors and the 2M fixed rotors respectively according to the pitch control distribution to achieve pitch trim and maneuver. During this process, the central control system controls the ruddervators 31, the 2N tilting rotors and the 2M fixed rotors according to the allocated pitch control distribution; for example, it can be speed differential control, the deflection of the ruddervators 31, etc., so that different pitch adjustment forces are generated at different positions of the vertical take-off and landing aircraft to balance the pitch impact force during the transition to horizontal flight.

In an embodiment, the vertical take-off and landing aircraft of the present application arranges 2N tilting rotors on the inner side of 2M fixed rotors, and arranges ruddervators 31 and a fully tilted tilting rotor on the empennage 30. Therefore, the pitch control process can be used to balance the pitch impact force during the transition to horizontal flight. Thus, on one hand, a smoother control process can be obtained. On the other hand, in the pitch control process, the power pod 442 of the tilting rotor on the empennage 30 rotates with the rotor during the tilt process. When hovering, the power pod 442 is immersed in the corresponding rotor. The shielding area of the power pod 442 is small, so the area where the rotor downwash hits the empennage 30 is small, which can reduce a part of the nose-up moment and improve the control of the pitch moment of the vertical take-off and landing aircraft under the complex interference flow field.

It should be noted that if the vertical take-off and landing aircraft does not include 2M fixed rotors, there is no need to consider the fixed rotors in step S332, and it is only necessary to allocate the pitch control distribution between the ruddervators 31 and the 2N tilting rotors according to the current airspeed or dynamic pressure. And correspondingly, in step S333, there is no need to consider the fixed rotor, and it is only necessary to control the ruddervators and the 2N tilting rotors according to the pitch control distribution to achieve pitch trim and maneuver.

Considering that the ruddervators 31 will often participate in the control process during the take-off of the vertical take-off and landing aircraft, therefore, in the pitch control process of the present application, before step S332, it further includes: it further includes step S331, controlling the ruddervators 31 to return to zero or actuate to a trim rudder deflection value matching the current air/dynamic pressure in a timely manner according to the current airspeed or the dynamic pressure, and gradually participating in the pitch control process. For example, an airspeed threshold may be set, and when the current airspeed is greater than or equal to the set airspeed threshold, the ruddervators 31 is returned to zero, to the initial position without deflection, and the deflection angle of the rudder surface is 0°.

In this embodiment, the controlling the ruddervators and the 2N tilting rotors respectively according to the pitch control distribution to achieve pitch trim and maneuver includes: differentially adjusting a pitch moment to perform the pitch trim and maneuver by a tilt speed difference between the tilting rotors at different positions and/or a tilt angle difference between the tilting rotors at different positions and/or a rotation speed difference between the tilting rotors at different positions.

Figure 27:
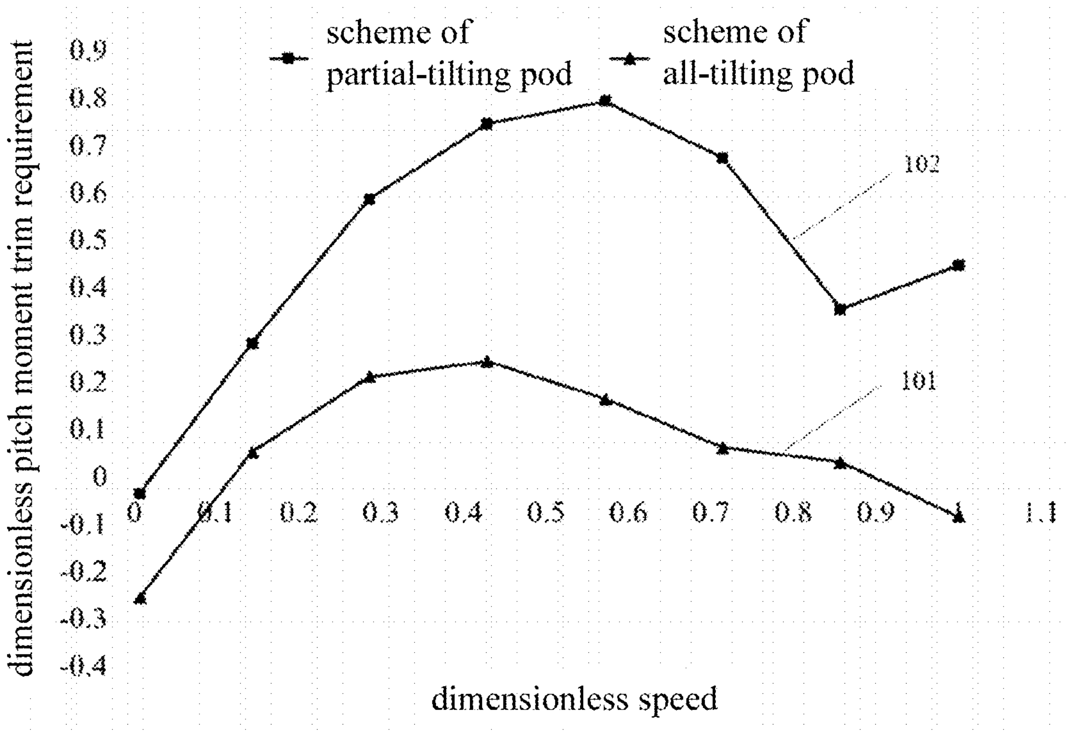
FIG. 27 is a control method for partial-tilting pod and all-tilting pod, and a curve (CFD simulation result) of a pitch moment (dimensionless) of a whole aircraft changing with a wind speed (dimensionless).

Referring to FIG. 27, which is a full-aircraft pitch moment curve generated by comparing the scheme of the partial-tilting power pod of the tilting rotor on the empennage 30 and the scheme of the all-tilting power pod of the tilting rotor on the empennage 30 by aerodynamic simulation analysis. The first curve 101 is a simulation curve of the simulation model in FIG. 7, and the structure of the tilting rotor of the tail in the aerodynamic simulation analysis refers to FIG. 20. The second curve 102 is a partial-tilting model. The partial-tilting model and the vertical take-off and landing aircraft model in FIG. 7 are the same except that the structure of the tilting rotor on the empennage 30 is different, which is the partial-tilting scheme of the power pod. In the simulation analysis in both models, the rotation speeds of the four fixed rotors and the four tilting rotors are equal and the thrust matches the aircraft takeoff weight (thrust and gravity balanced state).

The first curve 101 and the second curve 102 in FIG. 27 are respectively the curves of the pitch moment of the whole aircraft of the two models changing with the flight speed (i.e., wind speed). The flight speed in the figure is dimensionless, and the process from 0 to 1 is the maximum speed of the aircraft flying from the hovering state to the current tilt angle (keeping the above-mentioned 90° tilt angle unchanged), that is, flying from the minimum speed to the maximum speed at the current tilt angle. The pitch moment in the figure is also dimensionless.

From the comparison between the first curve 101 and the second curve 102 in FIG. 27, it can be seen that when there is no front and rear throttle differential of the eight rotors, the aircraft will generate a relatively large pitch moment. Therefore, in order to achieve a stable flight of the aircraft, it is necessary to balance the pitch moment so that the angular acceleration in the pitch direction is 0. Then, to balance this part of the aerodynamic pitch moment, the front and rear rotor throttle differential is required to offset the pitch moment generated by the rotor differential and the aerodynamic pitch moment generated by the aircraft body. The maximum pitch trim and maneuver generated by the control method of scheme of the all-tilting pod during flight requires 0.25 units. The maximum pitch trim and maneuver generated by the control method of scheme of the partial-tilting power pod 442 requires 0.8 units, which is much greater than the all-tilting control method. The greater the pitch moment generated during flight, the more difficult to control the aircraft, and the greater the additional power required by the propulsion system to adjust the aircraft's attitude. In addition, it can be seen from the simulation curve shown in FIG. 27 that as the flight speed increases, the pitch trim and maneuver demand fluctuations generated by the method of scheme of the partial-tilting power pod 442 are relatively large, from −0.04 in the hovering state (dimensionless wind speed is 0) to about 0.8 (dimensionless wind speed is 0.57), and the pitch moment fluctuates violently, which is extremely unfavorable for the pitch control of the aircraft. Taking the reverse into consideration, the pitch moment generated by the power pod 442 all-tilting control method changes from −0.25 in the hovering state (dimensionless wind speed is 0) to about 0.25 (dimensionless wind speed is 0.42), the pitch moment fluctuates little, which is conducive to the control of the aircraft's pitch direction. Therefore, the vertical take-off and landing aircraft and the pitch control method provided by the present application are simple and effective, and can effectively improve the safety of the aircraft.

In summary, the vertical take-off and landing aircraft of the present application is provided with an elevator and 2N tilting rotors. In the vertical take-off and landing state, the projections of the propellers of the 2N tilting rotors on the horizontal plane are centrally symmetric about point B, point B and the center of gravity point G of the vertical take-off and landing aircraft are both located in the symmetry plane of the fuselage, and point B is located at the side of point G close to the empennage. In addition, during the transition of the vertical take-off and landing aircraft from the vertical take-off and landing state to the cruising state, point B is always located at the side of point G close to the empennage. With this configuration, the center of gravity point G of the vertical take-off and landing aircraft and the symmetry center point B of the tilting rotors do not coincide with each other, and both the point G and the point B move toward the side close to the nose along the symmetry plane in the process of the vertical take-off and landing aircraft transitioning from the vertical take-off and landing state to the cruising state. Therefore, the moment of the pulling force generated by the tilting rotor in front of the center of gravity on the center of gravity point G is relatively small, and the moment of the pulling force generated by the tilting rotor in the rear of the center of gravity on the center of gravity point G is relatively large, and the moment difference between the front and rear tilting rotors can resist part of the nose-up moment generated by the tilting rotor wash area on the empennage acting on the empennage, thereby reducing the difficulty of pitch control. Therefore, when the tilting rotors on front and rear sides of the center of gravity G have the same speed throttle, the difference in the length of the lever arm to the center of gravity G will generate a nose-down moment, which can offset or partially offset the nose-down moment generated by the tilting rotor wash area on the empennage. Therefore, the vertical take-off and landing aircraft can better balance the pitch moment when the front and rear rotor throttles are consistent.

The control method of the present application allocates the pitch control distribution between the ruddervators and the 2N tilting rotors according to the current airspeed or dynamic pressure, and can realize the pitch control by the ruddervators and the 2N tilting rotors. Therefore, the present application effectively overcomes some practical problems in the prior art and has high utilization value and use significance.

What is claimed is:

1. A vertical take-off and landing aircraft, comprising:

a fuselage, wherein both sides of the fuselage are provided with wings symmetrically, a tail of the fuselage is provided with an empennage, and ruddervators are provided at the empennage; and 2N tilting rotors, symmetrically provided at both sides of the fuselage, wherein a part of the 2N tilting rotors are provided on the empennage;

wherein N is a natural number greater than or equal to 2;

in a vertical take-off and landing state, projections of propellers of the 2N tilting rotors on a horizontal plane are centrally symmetrical about a point B, the point B and a center of gravity point G of the vertical take-off and landing aircraft are both provided in a symmetry plane of the fuselage, and the point B is provided at a side of the point G close to the empennage; during transition flight of the vertical take-off and landing aircraft, both the point G and the point B are configured to move along the symmetry plane, and point B is always provided at the side of point G close to the empennage.

2. The vertical take-off and landing aircraft according to claim 1, wherein in a cruising state and/or a vertical take-off state and/or a transition state, a tilt speed of any tilting rotor on the empennage and a tilt speed of any tilting rotor at other positions have a first difference, and the first difference is not equal to 0.

3. The vertical take-off and landing aircraft according to claim 1, wherein in a cruising state and/or a vertical take-off state and/or a transition state, a rotation speed of any tilting rotor on the empennage and a rotation speed of any tilting rotor at other positions have a second difference, and the second difference is not equal to 0.

4. The vertical take-off and landing aircraft according to claim 1, wherein, the vertical take-off and landing aircraft comprises four tilting rotors, the four tilting rotors are symmetrically provided at both sides of the fuselage, wherein two of the tilting rotors are symmetrically provided on the wing about the fuselage, and another two of the tilting rotors are symmetrically provided on the empennage.

5. The vertical take-off and landing aircraft according to claim 1, wherein, the vertical take-off and landing aircraft comprises six tilting rotors, the six tilting rotors are symmetrically provided at both sides of the fuselage, four of the tilting rotors are symmetrically provided on the wing about the fuselage, and another two of the tilting rotors are symmetrically provided on the empennage.

6. The vertical take-off and landing aircraft according to claim 1, wherein:

the vertical take-off and landing aircraft further comprises 2M fixed rotors, wherein M is a natural number greater than or equal to 2;

the 2M fixed rotors are symmetrically provided at the wings on both sides of the fuselage and provided at the outer side of the tilting rotors;

in the vertical take-off and landing state, projections of all the fixed rotors on the horizontal plane are centrally symmetrical about a point A, and the point A is provided in the symmetry plane of the fuselage; and during the transition flight of the vertical take-off and landing aircraft, the point G is provided at a side of the point A close to the nose or the point G coincides with the point A, and the point B is always provided at a side of the point A close to the empennage.

7. The vertical take-off and landing aircraft according to claim 6, wherein:

an angle between rotation axes of the 2M fixed rotors and the symmetry plane of the fuselage is −15° to +15°; and/or an angle between a plane formed by the rotation axes of the 2N tilting rotors during a tilting process and the symmetry plane of the fuselage is −15° to +15°.

8. The vertical take-off and landing aircraft according to claim 6, wherein the vertical take-off and landing aircraft comprises four tilting rotors and four fixed rotors; a distance from the center of gravity point G to the point A is L1, $L1\geq 0$, a distance from the point A to the point B is L2, $L2>0$, a spacing between the four fixed rotors along a fuselage extension direction is L3, and a spacing between the four tilting rotors along the fuselage extension direction is L4, then $0.1\ (L3+L4)\geq 4L1+2L2\geq 0.01\ (L3+L4)$.

9. The vertical take-off and landing aircraft according to claim 1, wherein:

the empennage is a V-shaped tail, two tilting rotors are provided on the V-shaped tail, and the two tilting rotors are respectively provided at two upper tips of the V-shaped tail; and in the vertical take-off and landing state, along a direction parallel to a roll axis of the vertical take-off and landing aircraft, a distance between a rotation center of the tilting rotor on the empennage and a leading edge of the upper tip of the V-shaped tail is t1, a chord length of the upper tip of the V-shaped tail is t2, wherein, a ratio of t1 to t2 is 15% to 40%.

10. The vertical take-off and landing aircraft according to claim 1, wherein wing tips of the wing is provided with the tilting rotors, and the tilting rotors provided on the empennage and the tilting rotors provided on the wing tips of the wing are both tilting-nacelle rotors.

11. The vertical take-off and landing aircraft according to claim 1, wherein the tilting rotor provided on the empennage is a tilting-nacelle rotor, the tilting-nacelle rotor comprises a first rotor and a power pod, the first rotor is connected to the power pod, the power pod is rotatably connected to the empennage or the wing, and the power pod tilts synchronously with the first rotor during tilting process of the first rotor;

the first rotor comprises a propeller and a rotary drive device, and the propeller is provided on an output shaft of the rotary drive device; and the power pod comprises a pod shell and a tilt mechanism provided in the pod shell, the tilt mechanism is configured to drive the rotary drive device to tilt, so as to drive the propeller to tilt.

12. The vertical take-off and landing aircraft according to claim 1, wherein the ruddervators comprises control surface and drive device, the control surface is rotatably connected to the empennage or a tail of the fuselage, and the drive device is configured to drive the control surface to rotate so as to adjust a heading of the vertical take-off and landing aircraft.

13. The vertical take-off and landing aircraft according to claim 1, wherein a roll axis of the vertical take-off and landing aircraft is taken as a reference and is defined as 0°, with the tilting rotor tilting upward as a positive direction and the tilting rotor tilting downward as a negative direction, and a rotation axis of the tilting rotor is configured to tilt within a range of −20° to 110°.

14. The vertical take-off and landing aircraft according to claim 1, wherein the empennage is a forward-swept empennage, and the tilting rotor provided on the forward-swept empennage is a tilting-nacelle rotor.

15. A control method for the vertical take-off and landing aircraft according to claim 1, comprising following pitch control process:

allocating a pitch control distribution between the ruddervators and the 2N tilting rotors according to a current airspeed or a dynamic pressure; and controlling the ruddervators and the 2N tilting rotors respectively according to the pitch control distribution to achieve pitch trim and maneuver.

16. The control method according to claim 15, wherein before the allocating the pitch control distribution between the ruddervators and the 2N tilting rotors according to the current airspeed or dynamic pressure, the control method further comprises following rotor control process:

obtaining a current tilt position of each tilting rotor;

in response to the current tilt position being inconsistent with a set cruise position, obtaining a current airspeed or a dynamic pressure of a corresponding tilting rotor at the current tilt position, and determining whether the current airspeed or the dynamic pressure is equal to or greater than a preset threshold value at the current tilt position;

in response to the current airspeed or the dynamic pressure being equal to or greater than the preset threshold value at the current tilt position, controlling the tilting rotor to tilt to a preset next position; and increasing rotation speeds of the 2N tilting rotors gradually.

17. The control method according to claim 16, wherein the control method further comprises: executing the rotor control process and the pitch control process repeatedly in sequence until the tilting rotor is tilted to a cruise position, and a transition from a take-off to a horizontal flight is completed.

18. The control method according to claim 16, wherein:

the vertical take-off and landing aircraft further comprises 2M fixed rotors, wherein M is a natural number greater than or equal to 2; the 2M fixed rotors are symmetrically provided at the wings on both sides of the fuselage and provided at the outer side of the tilting rotors; and in a process of increasing rotation speeds of the 2N tilting rotors gradually, the control method further comprises: reducing rotation speeds of the 2M fixed rotors to a set rotation speed gradually.

19. The control method according to claim 18, wherein before the controlling the tilting rotor to tilt to the preset next position, the control method further comprises following take-off control process:

tilting the 2N tilting rotors to a rotation axis vertically upward or inclined upward;

deflecting the ruddervators downward; and starting the 2M fixed rotors and the 2N tilting rotors, and issuing a horizontal flight command in response to the vertical take-off and landing aircraft reaching a set altitude.

20. The control method according to claim 15, wherein:

the vertical take-off and landing aircraft further comprises 2M fixed rotors, wherein M is a natural number greater than or equal to 2; the 2M fixed rotors are symmetrically provided at the wings on both sides of the fuselage and provided at the outer side of the tilting rotors;

before the allocating the pitch control distribution between the ruddervators and the 2N tilting rotors according to the current airspeed or the dynamic pressure, the control method further comprises following take-off control process:

tilting the 2N tilting rotors to a rotation axis horizontally forward;

deflecting the ruddervators downward; and starting the 2M fixed rotors and the 2N tilting rotors, and issuing a horizontal flight command in response to the vertical take-off and landing aircraft reaching a set altitude.

* * * * *